(12) United States Patent
Takamura et al.

(10) Patent No.: US 6,493,109 B1
(45) Date of Patent: Dec. 10, 2002

(54) PRINT HEAD DRIVING APPARATUS AND PRINTER USING THE SAME

(75) Inventors: Jun Takamura, Mishima (JP); Noboru Nitta, Shizuoka-ken (JP); Shunichi Ono, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/387,427

(22) Filed: Aug. 31, 1999

(30) Foreign Application Priority Data

Sep. 4, 1998 (JP) ............................................. 10-251296

(51) Int. Cl.[7] ................................................ G06K 15/00
(52) U.S. Cl. ....................................... 358/1.18; 358/1.1
(58) Field of Search .......................... 358/1.1, 1.8, 1.16, 358/1.17, 296, 498, 300, 449, 1.15; 347/237, 240, 131, 132, 182, 13, 15

(56) References Cited

U.S. PATENT DOCUMENTS 5,539,433 A 7/1996 Kawai et al.
6,100,914 A * 8/2000 Inukai et al. ................ 347/240

FOREIGN PATENT DOCUMENTS

JP 8-72302 3/1996
JP 8-224868 9/1996

* cited by examiner

Primary Examiner—Arthur G. Evans
(74) Attorney, Agent, or Firm—Frishauf, Holtz, Goodman & Chick, P.C.

(57) ABSTRACT

A print head driving apparatus is provided with an input terminal for inputting serial data which includes printing data and timing data put in the printing data, a printing data number control circuit for detecting the timing data, a shift register and a latch circuit for extracting the printing data from the serial data with the timing data used as a starting point, and a driving waveform selecting circuit for outputting a driving signal based on the printing data extracted from the shift register and latch circuit. With this constitution, no control signal for latching is needed.

18 Claims, 20 Drawing Sheets

PRINT HEAD DRIVING APPARATUS AND PRINTER USING THE SAME

BACKGROUND OF THE INVENTION

The present invention relates to a print head driving apparatus driving a print head based on inputted print data and a printer using the same.

Conventionally, previous apparatus is one driving an LED chip in which many LEDs (light emitting devices) though not shown. The print head driving apparatus having a plurality of AND circuits and switches, a processing unit including a D/A converter and the like, a shift register connecting to this processing unit and internally divided into an m-bit shift register and an n-bit shift register which receive data, a latch circuit latching printing data received by the m-bit shift register, a latch circuit latching printing data received by the n-bit shift register and a switch circuit which can switch a single use mode in which only the m-bit shift register is used to/from a combination use mode in which the m-bit shift register and the n-bit shift register are used in combination with each other.

In the above apparatus, in the combination use mode switched by the switch circuit, m-bit printing data adjusting data and n-bit printing data adjusting data are latched by different timing and the LED chip is driven by drive signals at different timing.

However, if a plurality of print head driving apparatuses are used to drive a long line head as in the case of a conventional apparatus in which a shift register is divided into a plurality of registers, it is necessary to change drive timing for the respective driving apparatuses due to mechanical limitations and so on. In addition, if a so-called tandem type color printer provided with a printing unit for printing data with Yellow, Magenta, Cyan and Black is to be realized by using the conventional head driving apparatus, different head driving apparatuses for the printing units for the respective colors are required. This applies to not only a case where line heads of the respective colors are driven by a plurality of head driving apparatuses but also a case where they are driven by a single head driving apparatus. Further, the head driving apparatuses corresponding to the printing units of respective colors should be driven differently since it is necessary to latch print data at different timing and to carry current to thereby print the data.

For these reasons, the conventional apparatus has disadvantages in that latch signals (LACH) and driving signals in addition to printing data should be transmitted to the head driving apparatuses, respectively, a head control section controlling the head driving apparatuses requires many control lines and connectors for connection should be of multi-pin type.

Moreover, even if a single head driving apparatus drives a single line head, too many control lines and connectors are used. Thus, the conventional apparatus has disadvantage in that cost reduction cannot be sufficiently realized.

BRIEF SUMMARY OF THE INVENTION

It is an object of the present invention to provide an inexpensive print head control apparatus capable of reducing the number of signal lines necessary to control a head driving apparatus, capable of driving print heads without increasing signal lines even if the print heads differ in printing timing and capable of reducing the number of IC pins in a head control section controlling the head driving apparatus, the number of communication cables and connector pins for connecting the head driving apparatus to the head control section, and to provide a printer using this apparatus.

The present invention is a print head driving apparatus including input means for inputting serial data including printing data and timing data put in the printing data; extracting means for detecting the timing data included in the serial data inputted by the input means and for extracting the printing data from the serial data with the detected timing data as a starting point; and output means for outputting a driving signal for driving a print head for printing based on the printing data extracted by the extracting means.

According to the present invention constituted as stated above, there is no need to independently provide timing of the register and latching timing of the latch circuit, a timing signal of one bit or more put in the printing data is detected and the printing data, which is the serial data, is latched based on this timing signal. Thus, it is possible to realize cost reduction and to make an apparatus smaller in size by reducing signals necessary for the print head driving apparatus.

Further, the present invention is worked by many other embodiments showing modifications including, for example, a case where no latch signal is needed by providing an enable signal, a case where a plurality of print head driving apparatuses are cascade-connected, a case where a counter is replaced by an inverter and a case where a plurality of print head driving apparatuses are specified for a plurality of color print heads.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

Now, the first embodiment according to the present invention in which the present invention is applied to a print head driving apparatus provided with a single driving apparatus, will be described with reference to FIGS. 1 through 3.

Figure 1:
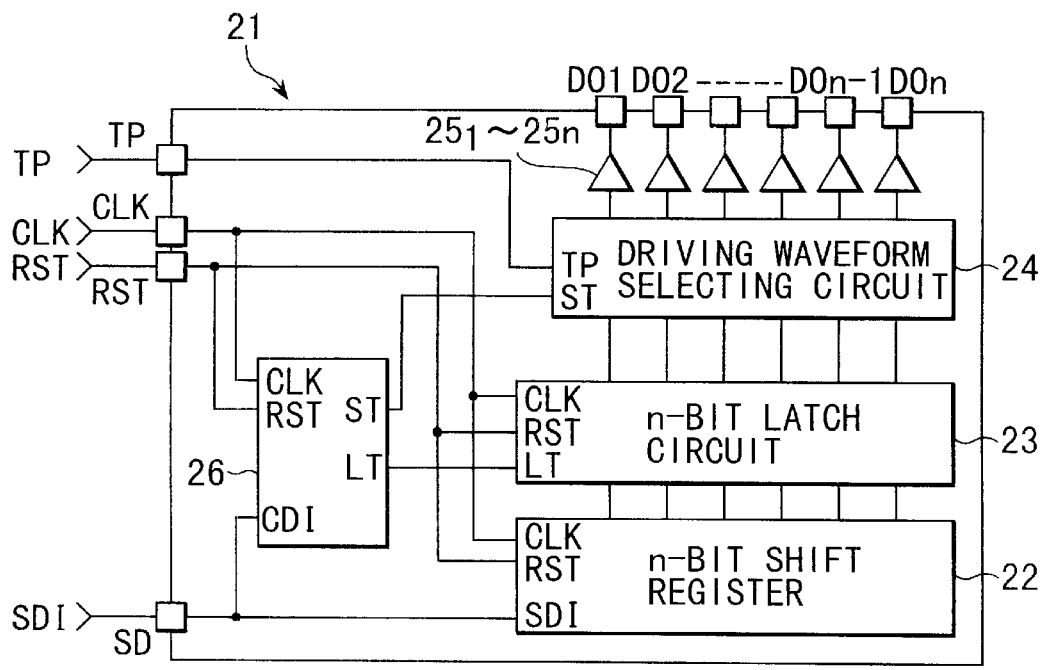
FIG. 1 is a circuit block diagram showing the constitution of a print head driving apparatus in the first embodiment according to the present invention.
Figure 3:
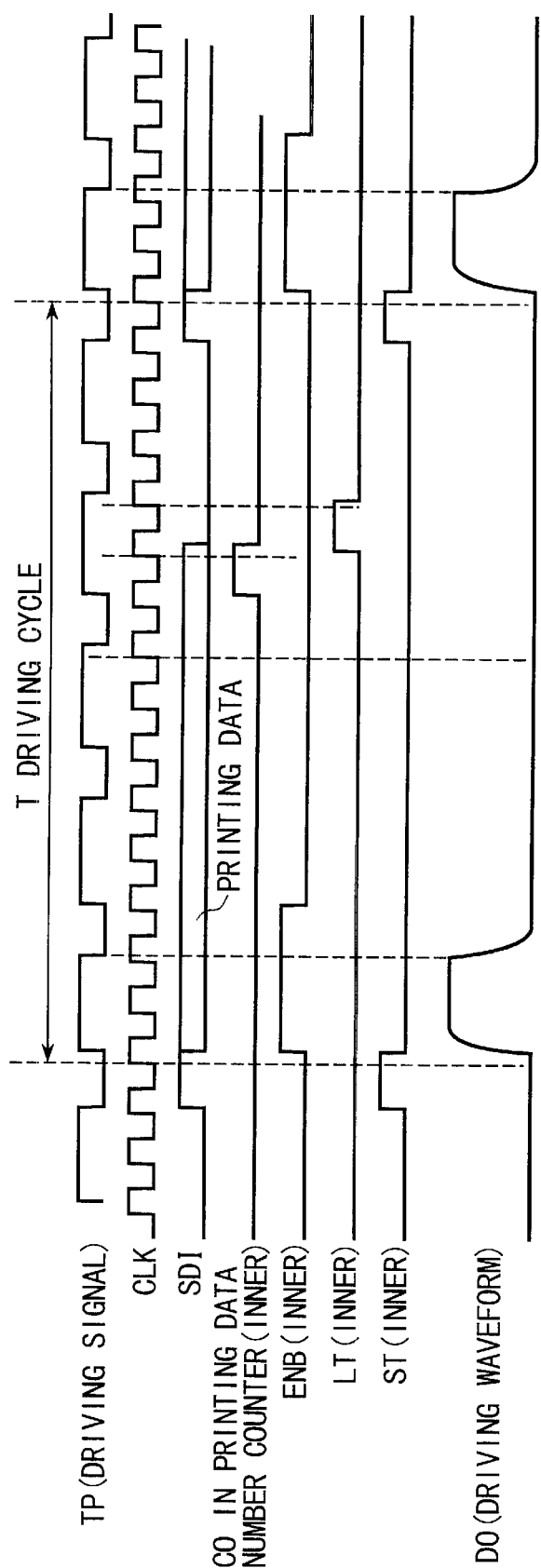
FIG. 3 is a timing chart showing the operational timing of the print head driving apparatus shown in FIG. 1.

FIG. 1 is a block diagram showing the constitution of a head driving apparatus in this embodiment and FIG. 3 is a timing chart showing the control of this apparatus. The head driving apparatus 21 in this embodiment is provided with an n-bit shift register 22 receiving serial data (SDI) including print data consisting of 1-bit pixels through an SD terminal. This n-bit shift register 22 sequentially shifts print data among the serial data (SDI) synchronously with a clock signal (CLK) and receive them. The n-bit shift register 22 is designed to be reset by a reset signal (RST) from an RST terminal. The clock signal (CLK) from the CLK terminal and the reset signal (RST) from the RST terminal are also inputted to the CLK terminal and RST terminal of a printing data number control circuit 26 and to those of an n-bit latch 23 both of which will be described later.

If the print data are received by the n-bit shift register 22, the data are latched by the n-bit latch 23 using a latch signal (LT) from the printing data number control signal 26.

The print head apparatus 21 in this embodiment is also provided with output pins DO1 to DOn outputting driving waveforms for driving a print head (not shown) in which n output devices (such as an LED (light emitting device), a heat emitting device and ink containers of an inkjet head) and with a driving waveform selecting circuit 24 selecting a driving signal from among selected driving waveform (TP) inputted through the TP terminal. The driving signal selected by the driving waveform selecting circuit 24 is outputted to buffers 251 to 25n, which buffers 251 to 25n output driving waveforms to the output pins DO1 to DOn, respectively. The driving signals (TP) mentioned herein are signals repeated at equal intervals five times in a driving cycle.

The driving waveform selecting circuit 24 refers to inputted 1-bit printing data which is original printing data for selecting a driving signal for driving the corresponding output devices in the print head, and selects a driving signal based on the content of the printing data.

The serial data (SDI) is data consisting of 1-bit High data and Low data added-n-bit printing data, both of which High and Low data are put in front of and in back of the n-bit printing data, respectively. The serial data (SDI) is also inputted to the CDI terminal of the printing data number control circuit 26. If inputting 1-bit High data in the serial data (SDI), the printing data number control circuit 26 counts inputted printing data following the 1-bit High data with the 1-bit High data as a starting point. When data counting is finished, the printing data number control circuit 26 outputs a latch signal (LT) to the n-bit latch 23.

Figure 2:
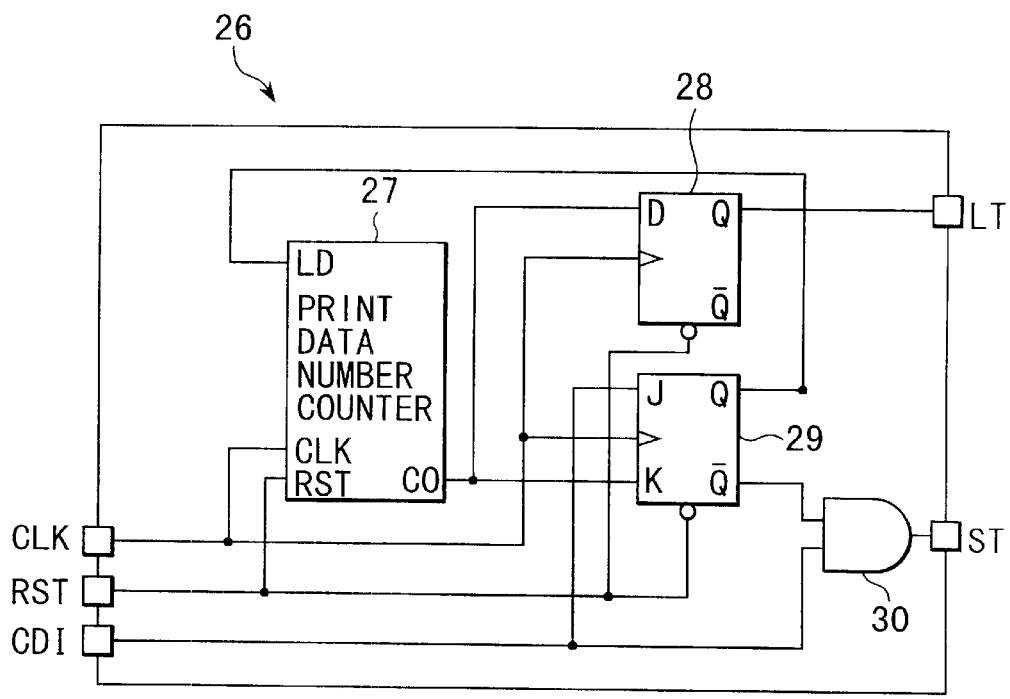
FIG. 2 is a circuit block diagram showing the constitution of a printing data number control circuit shown in FIG. 1.

Specifically, the printing data number control circuit 26 comprises a printing data number counter 27 in which data for counting the number of n-bit print data is set, a D-FF (flip-flop) 28 and a JK-FF 29, as shown in FIG. 2. The clock signal (CLK) inputted through the CLK terminal is inputted to the CLK terminals of the printing data number counter 27, the D-FF 28 and JK-FF 29. The reset signal (RST) inputted through the RST terminal is inputted to the RST terminals of the printing data number counter 27, the D-FF 28 and the JK-FF 29. In addition, the serial data (SDI) inputted from through CDI terminal is inputted to the J terminal of the JK-FF 29.

A count end signal is outputted from a CO terminal of the printing data number counter 27 and inputted to the D terminal of the D-FF 28 and to the K terminal of the JK-FF 29. An output from the Q terminal of the D-FF 28 becomes a latch signal and the latch signal is outputted through the LT terminal of the printing data number control circuit 26. The Q terminal of the JK-FF 29 is connected to the LD terminal of the printing data number counter 27. Further, an output from a /Q terminal which is the inverted output terminal of the JK-FF 29 is inputted to an AND gate 30 together with the serial data (SDI) from the CDI terminal. An output from the AND gate 30 is outputted as, a signal which serves as a starting signal during the selection of a driving waveform, from an ST terminal, and inputted to the ST terminal of the driving waveform selecting circuit 24.

The operation of the print head driving apparatus constituted as stated above will be described with reference to FIG. 3.

First, when a reset signal (RST) is inputted to the head driving apparatus 21, the respective circuits are initiated. Also, a driving signal is inputted from the TP terminal of the head driving apparatus 21 once per driving cycle.

Serial data (SDI) is inputted from the SD terminal synchronously with a common clock signal (CLK). Specifically, if the serial data (SDI) is inputted to the SD terminal of the head driving apparatus 21 so that printing data is latched at next timing after the driving signal (TP) is over, the printing data number counter 27 of the printing data number control circuit 26 is activated by the first 1-bit High data (leading data) and the counter 27 starts counting data of n bits.

The serial data (SDI) is transferred to the n-bit shift register 22 in the head driving apparatus 21. If the printing data number counter 27 finishes counting n bits, the count end signal is outputted from the CO terminal of the printing data number counter 27, and the counter 27 stops counting. The count end signal of the counter 27 is outputted as a latch signal from the Q terminal of the D-FF 28, and inputted to the n-bit latch 23 from the LT terminal of the printing data number control circuit 26 when a clock rises following the stop of the printing data number counter 27. In this way, a latch signal (LT) for inputting the output data of the n-bit shift register 22 into the n-bit latch 23 is created by the printing data number control circuit 26.

Next, when the apparatus 21 receives serial data (SDI) synchronously with the driving signal (TP), an ENB signal for selecting a driving signal (TP) from the TP terminal based on the output from ST terminal and the printing data latched by the n-bit latch 23 is generated by the driving waveform selecting circuit 24 and the print head is driven by the driving waveforms outputted from the output pints DO1 to DOn. Thereafter, every time the apparatus 21 receives serial data (SDI), printing operation is repeatedly performed.

As described above, by providing the printing data number control circuit 26 and inputting serial data (SDI) consisting of the printing data and, High data (leading data) and Low data (trailing data) which are put in front of and in back of the print data, respectively, the printing data counter 27 counting printing data is activated by the leading data. If necessary print data has been stored in the n-bit shift register 22, then the printing data number counter 27 stops counting, a latch signal LT is outputted from the printing data number control circuit 26 and a driving signal (TP) is selected from the driving waveform selecting circuit 24 by the printing data from the n-bit latch 23. Owing to this, the side of controlling the head driving apparatus 21 can print the printing data only by adding data of as low as two bits to the print data and transmit the resultant data to the print head driving apparatus 21. This makes it possible to dispense with a control line to apply a latch signal from an external unit and to thereby reduce the number of overall control lines. Besides, the reduced number of necessary control lines facilitates controlling the head driving apparatus 21.

Figure 23:
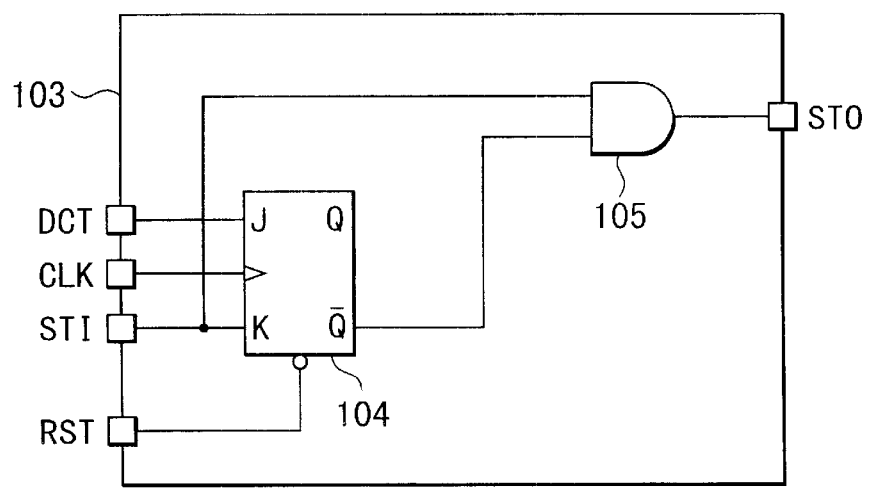
FIG. 23 is a circuit block diagram showing a driving waveform masking circuit which is a constituent element of the print head driving apparatus shown in FIG. 22.

If a plurality of the driving apparatuses in this embodiment are used for, for example, a tandem type color printer as shown in FIG. 23 to print out data, driving signals are selected within the head driving apparatuses 21 and, therefore, the driving signals (TP) may be inputted through a control line common to the heads. Thus, not only the number of control lines for the respective latch signals can be reduced but also the number of overall control lines can be reduced. Besides, the print position can be adjusted with an accuracy of one-fifth of print resolution by adjusting only the transfer timing for transferring serial data (SDI), whereby high quality print out can be realized.

It goes without saying that if the number of the driving signals in a driving cycle increases, the print position can be adjusted further minutely. In this case, too, driving signals can be inputted through a control line common to the respective heads, thereby making it possible to reduce the number of control lines compared to the conventional apparatus in which control lines are required for the respective heads.

Second Embodiment

Next, description will be given to the second embodiment in which the present invention is applied to a print head driving apparatus provided with one driving apparatus, with reference to FIGS. 4 through 6. It is noted that the same reference symbols denote the same constituent elements as those in the first embodiment and that detailed description will not be given thereto.

A head driving apparatus in this embodiment is designed such that the transfer of serial data (SDI) can be finished from the end of a driving signal to the start of the next driving signal due to the relationship between a driving cycle (T) and a driving signal (TP).

Figure 4:
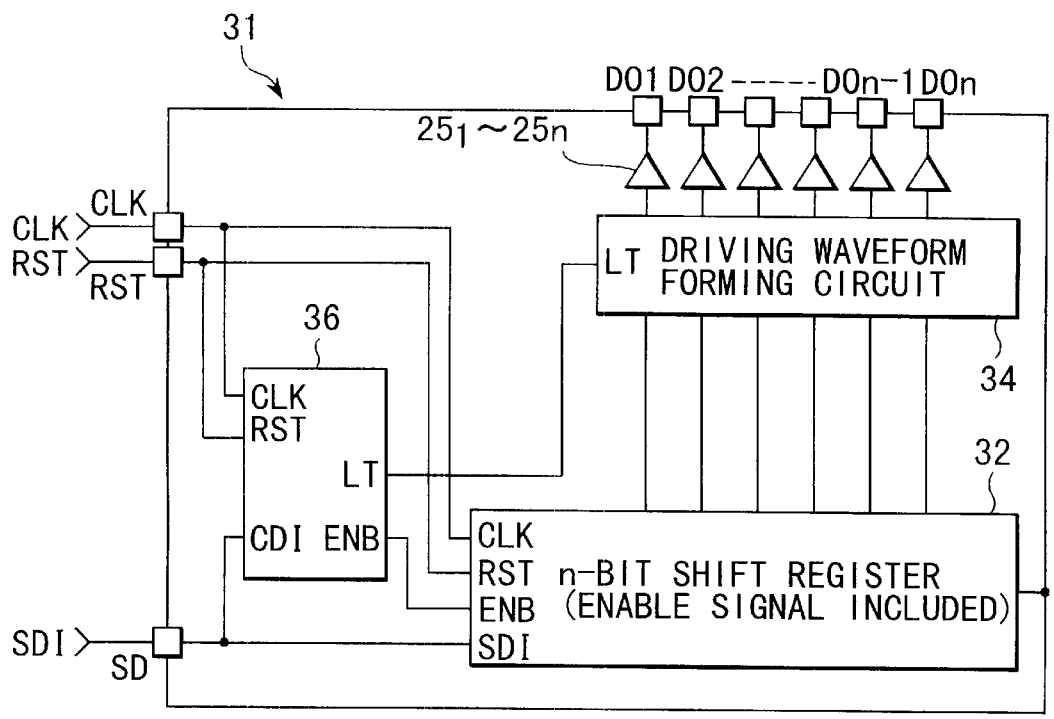
FIG. 4 is a circuit block diagram showing the constitution of a print head driving apparatus in a second embodiment according to the present invention.

FIG. 4 is a block diagram showing the constitution of a head driving apparatus 31 in this embodiment. The head driving apparatus 31 differs from that shown in FIG. 1 in that the n-bit latch 23 is not provided and, instead, an enable signal inclusive n-bit shift register 32 is used, that the driving waveform selecting circuit 24 is replaced by a driving waveform forming circuit 34 to which printing data from the n-bit shift register 32 is inputted and that an output from the LT terminal of a printing data number control circuit 36 is inputted to the LT terminal of the driving waveform forming circuit 34.

Figure 5:
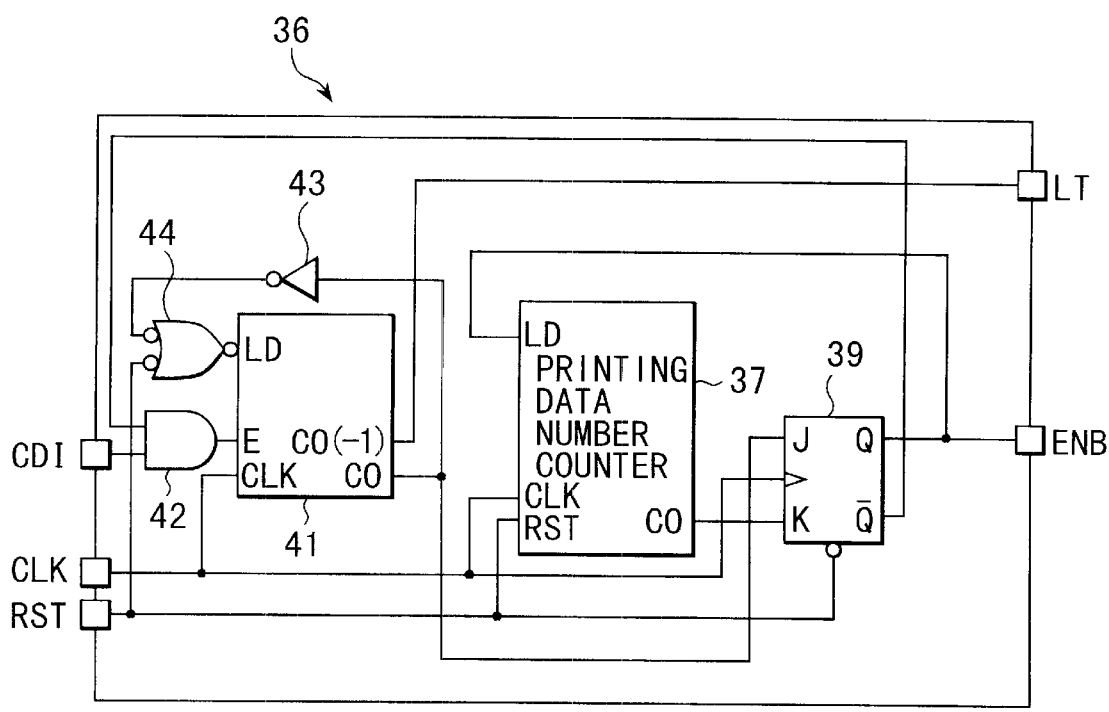
FIG. 5 is a circuit block diagram showing the constitution of a printing data number control circuit shown in FIG. 4.
Figure 6:
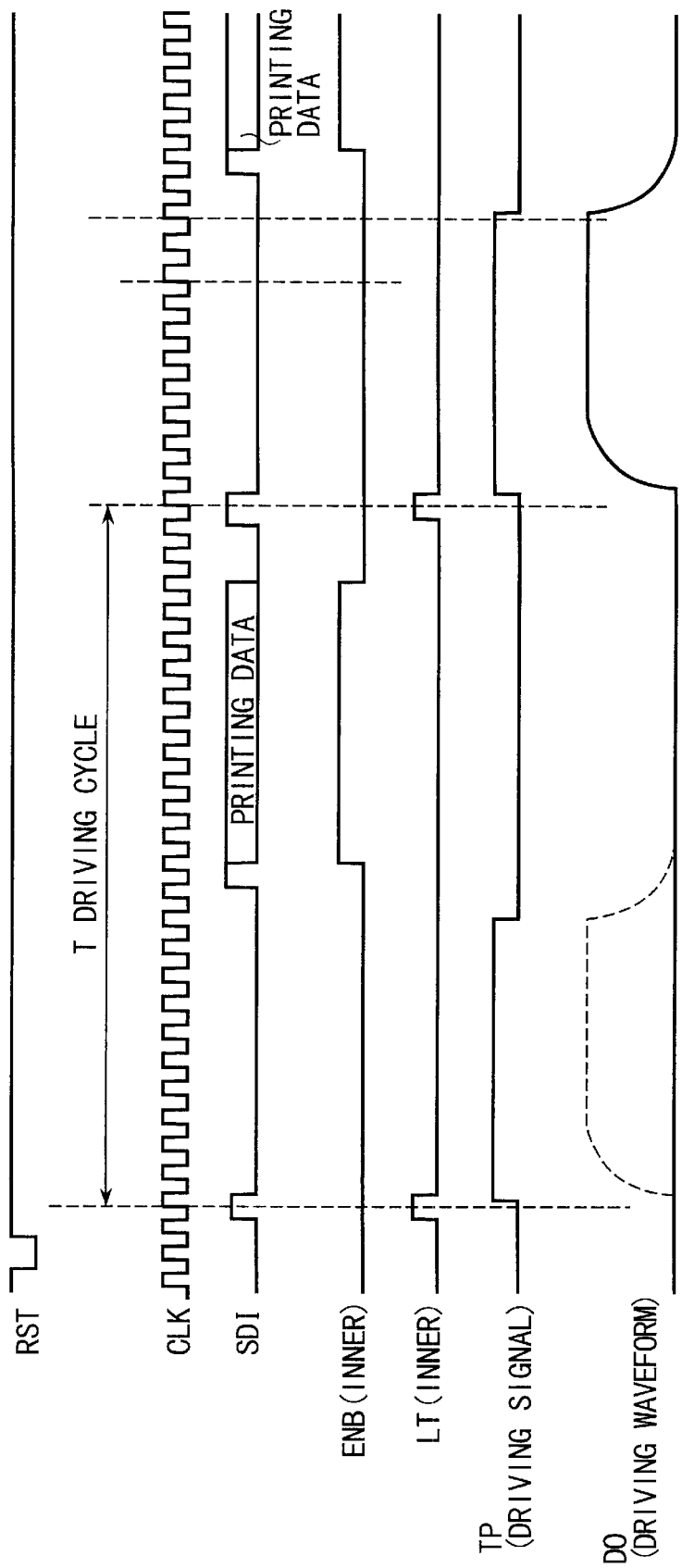
FIG. 6 is a timing chart showing the operational timing of the print head driving apparatus shown in FIG. 4.

The printing data number control circuit 36 in this embodiment is provided with a printing data number counter 37 in which data for counting the number of n-bit printing data is set, a JK-FF 39 and a two-bit counter 41 counting data other than printing data, as shown in FIG. 5. Serial data inputted from an CDI terminal is inputted to the E terminal of the two-bit counter 41 through the two-input AND gate 42. An output from a CO terminal which is the output terminal of the two-bit counter 41, as well as a reset signal (RST) from an RST terminal, is inputted to the inverted input terminal of a two-input NOR gate 44 through an inverter 43, and the output of the two-bit NOR gate 44 is connected to the LD terminal of the two-bit counter 41. An output from the CO terminal of the two-bit counter 41 is also inputted to the J terminal of the JK-FF 39.

In the two-bit counter 41, a CO(−1) terminal for outputting data of one count earlier is connected to the LT terminal and an output from the CO(−1) terminal is inputted to the driving waveform forming circuit 34 as an LT signal which supplies a timing for forming a driving waveform.

The CO terminal which is the output terminal of the printing data number counter 37 is connected to the K terminal of the JK-FF 39. The Q terminal which is the output terminal of the JK-FF 39 is connected to an ENB terminal. An output from the ENB terminal is inputted to an n-bit shift register 32 as an ENB signal. In addition, the Q-terminal which is the output terminal of the JK-FF 39 is also connected to the LD terminal of the printing data number counter 37. The /Q terminal which is the inverted output terminal of the JK-FF 39 is connected to the E terminal of the two-bit counter 41 through the AND gate 42.

The operation of the print head driving apparatus 31 as constituted state above will be described with reference to FIG. 6.

First, when a reset signal (RST) is inputted to the head driving apparatus 31, the respective circuits are initiated. One-bit High data for outputting a driving signal is inputted from the SD terminal to the head driving apparatus 31 as an SDI signal. This signal is inputted to the enable terminal of the two-bit counter 41 in the printing data number control circuit 36 and an LT signal is outputted from the 2-bit counter 41. The LT signal is inputted to the driving waveform forming circuit 34 and a driving signal is formed. It is noted, however, that right after the head driving apparatus 31 has been reset, printing data is zero and no driving waveform is outputted from output pins DO1 to DOn.

Thereafter, when the driving signal TP is over, serial data (SDI) consisting of printing data, and one-bit High data and Low data which are put in front of and in back of the print data, respectively, is inputted to the apparatus 36. The first one-bit High data allows the output (CO) of the two-bit counter 41 to turn into High. Then, the printing data number counter 37 of the printing data number control circuit 36 is activated and starts counting data of n bits, and the two-bit counter 41 loads data. At the same time, a signal (ENB) for enabling the n-bit shift register 32 rises and printing data is transferred to the n-bit shift register 32.

When the counter 41 finishes counting the data by n bits, a count end signal (CO) is outputted from the printing data number counter 37. As a result, the enable signal (ENB) falls and the n-bit register 32 holds the print data at that time.

The driving waveform forming circuit 34 forms a driving signal (TP) with High data to be inputted next uses as a starting point and whether to carry current or not is then selected based on the printing data from the n-bit shift register 32 to thereby output the result as a driving waveform. By doing so, driving waveforms are outputted from the output pins DO1 to DOn, respectively and the print head is driven. Thereafter, every time serial data (SDI) is received, printing operation is repeatedly performed.

Thus, by providing the printing data number control circuit 36 and the enable signal inclusive n-bit shift register 32 and inputting serial data (SDI), consisting of printing data and High data (leading data) put in the printing data, to the printing data number control circuit 36, the printing data number counter 37 counting printing data is activated by the leading data and a signal (ENB) enabling the n-bit shift register 32 rises. When necessary data has been stored in the n-bit shift register 32, the printing data number counter 37 finishes data counting and a count end signal (CO) is outputted from the printing data number control circuit 36, whereby the signal (ENB) enabling the n-bit shift register 32 falls and printing data is held. Thus, it is possible to dispense with a latch circuit and, as in the case of the first embodiment, to dispense with a control line for a latch signal.

Further, High data is put in back of Low data (trailing data) put in back of the printing data in the serial data (SDI) and the control circuit 36 outputs an LT signal as a starting point for forming and outputting a drive signal at the driving waveform forming circuit 34 in response to the input of the High data. Due to this, it is not necessary to input a driving signal (TP) from an external unit as shown in the first embodiment, thereby making it possible to dispense with a signal line for the driving signal.

Accordingly, the side of controlling the head driving apparatus 31 can carry out printing operation only by adding data of as low as three bits to the printing data, thereby facilitating control operation.

Further, in case of controlling a plurality of head driving apparatuses 31, it is possible to start the respective head driving apparatuses 31 at different timing by inputting data other than the printing data to the respective head driving apparatuses 31 at different timing.

Third Embodiment

Next, description will be given to the third embodiment in which the present invention is applied to a case where the output and input of the printing data of two head driving apparatuses are cascade-connected, with reference to FIGS. 7 through 9.

Figure 7:
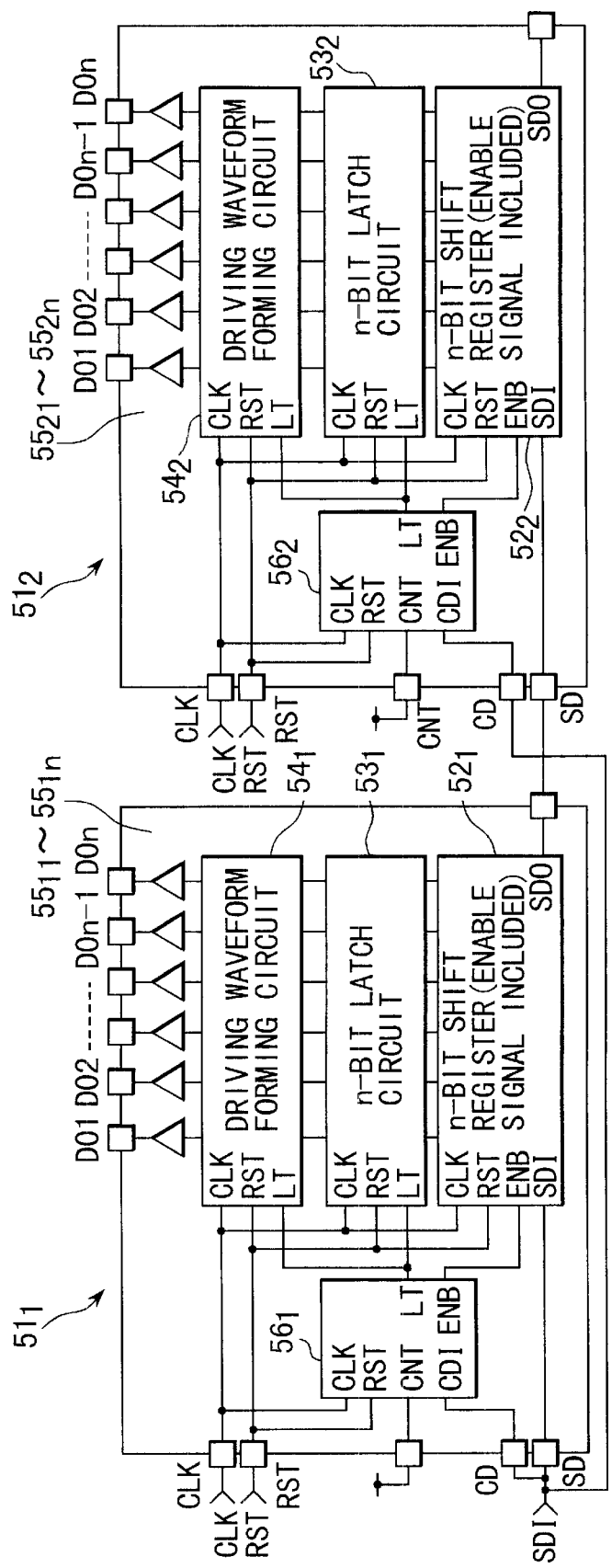
FIG. 7 is a circuit block diagram showing the constitution of a print head driving apparatus in a third embodiment according to the present invention.
Figure 9:
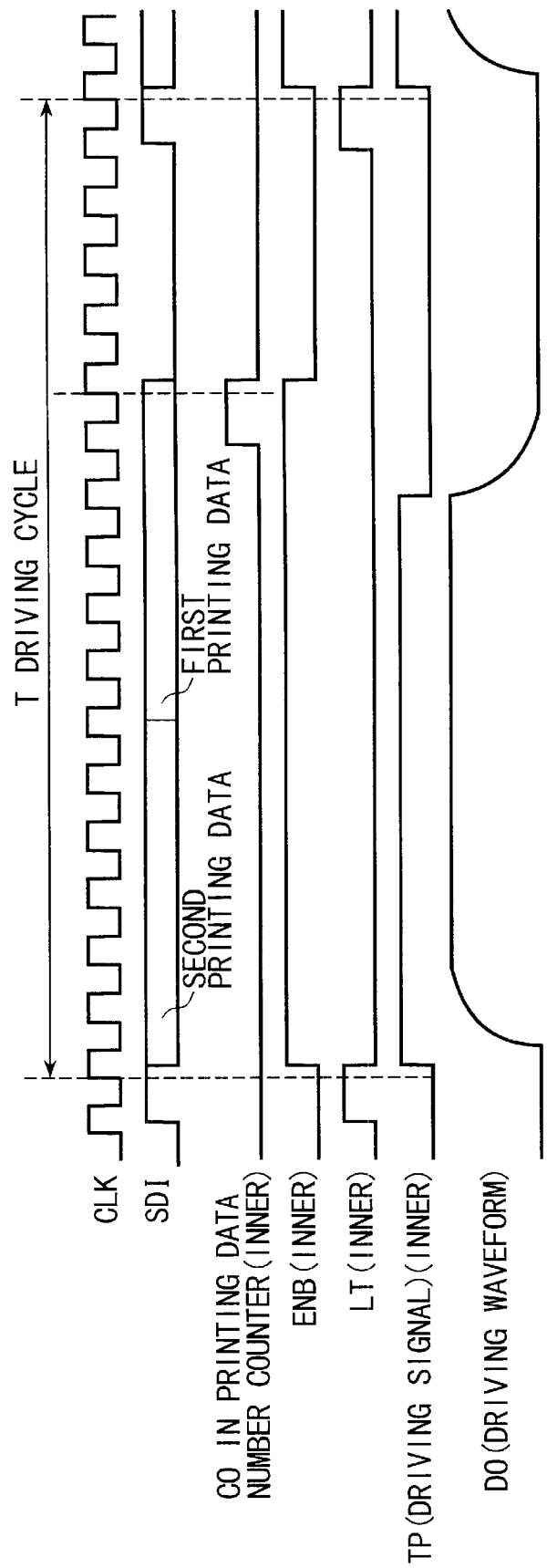
FIG. 9 is a timing chart showing the operational timing of the print head driving apparatus shown in FIG. 7.

FIG. 7 is a block diagram showing the constitution of a head driving apparatus in this embodiment and FIG. 9 is a timing chart showing the control of this apparatus.

Since head driving apparatuses 511 and 512 in this embodiment are the same in constitution, the first head driving apparatus 511 will be typically described herein. For the convenience of illustration, a subscript 1 is added to constituent elements in the first head driving apparatus 511 and a subscript 2 is added to those in the second driving apparatus 512.

The first head driving apparatus 511 is provided with an enable signal inclusive bit shift register 512 receiving serial data (SDI) through an SD terminal and sequentially shifts and receives printing data synchronously with a clock signal (CLK) if an enable signal (ENB) from an ENB terminal is High. The n-bit shift register 521 is reset by a reset signal (RST) from an RST terminal. The clock signal (CLK) from the CLK terminal and the reset signal (RST) from the RST terminal are also inputted to the CLK terminal and RST terminal of a printing data number control circuit 561 and those of an n-bit latch 531.

If received by the n-bit shift register 521, the printing data is latched by the n-bit latch 531 using a latch signal (LT) from the printing data number control circuit 561.

In this apparatus, there are provided output pins DO1 to DOn outputting drive waveforms for driving a print head (not shown) in which n output devices (such as an LED (light emitting device), a heat emitting device and ink containers for an inkjet head), and a driving waveform forming circuit 541 selecting a driving waveform based on the printing data by the n-bit latch 531 using the latch signal (LT) inputted through the LT terminal from the printing data number control circuit 561. The driving signal selected by the driving waveform forming circuit 541 is outputted to the buffers 5511 to 551n, which output driving waveforms to the corresponding output pins DO1 to DOn, respectively.

The serial data (SDI) consists of printing data, which includes the first printing data for driving the first head driving apparatus 511 and the second printing data for driving the second head driving apparatus 512 in this order, and one-bit High data and Low data which are put in front of and in back of the printing data. The serial data (SDI) is also inputted to the CDI terminal of the printing data number control circuit 561 through the CD terminal. If the printing data number control circuit 561 inputs the one-bit High data in the serial data (SDI), an ENB signal starting from the 1-bit High data rises to allow counting printing data to be inputted next. If the data counting is finished, the ENB signal falls. Also, the printing data number control circuit 561 is designed to output a latch signal (LT) to the n-bit latch 531 at the timing of the first High data.

Figure 8:
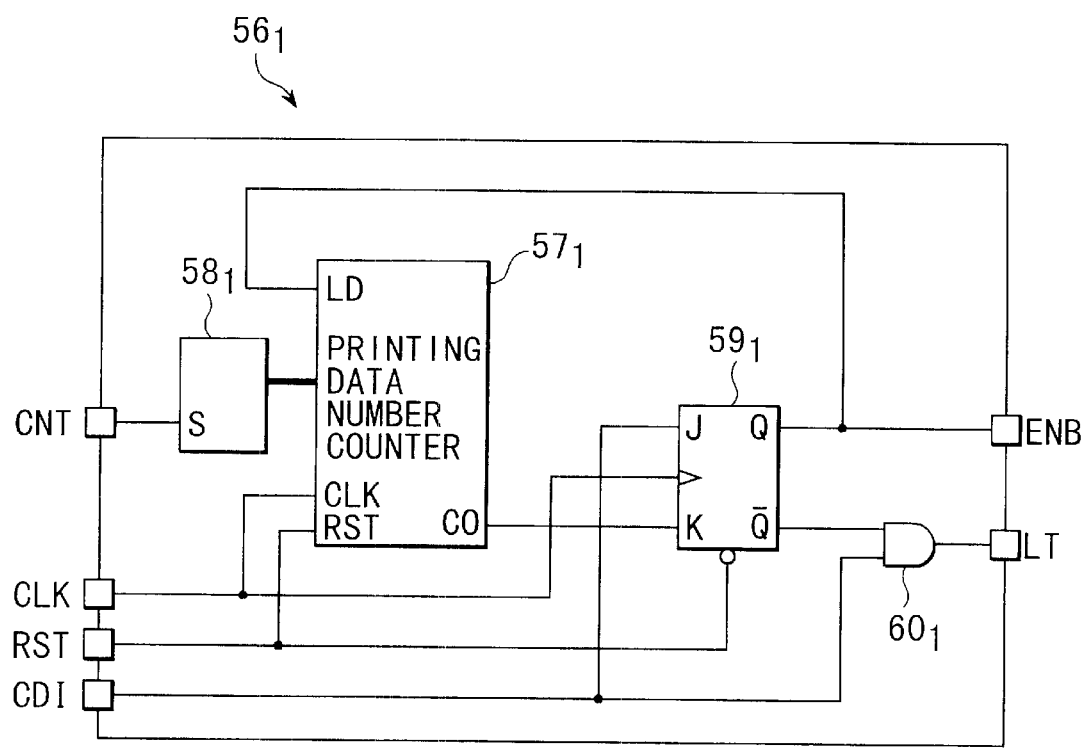
FIG. 8 is a circuit block diagram showing the constitution of a printing data number control circuit shown in FIG. 7.

Specifically, as shown in FIG. 8, the printing data number control circuit 561 is provided with a printing data number control counter 571, a printing data number setting circuit 581 setting the number of printing data (bit number) to be counted by the printing data number counter 571 and a JK-FF 591. A clock signal (CLK) inputted at the CLK terminal is inputted to the CLK terminal of the printing data number counter 571 and to that of the JK-FF 591. A reset signal (RST) inputted from the RST terminal is inputted to the RST terminal of the printing data number counter 571 and to that of the JK-FF 591. Serial data (SDI) inputted from the CDI terminal is inputted to the J terminal of the JK-FF 591.

The printing data number setting circuit 581 sets printing the data number counted by the printing data number counter 571 at 2-n bits when the CNT terminal is High and sets the printing data number at n bits when the CNT terminal is Low. That is, if two head driving apparatuses 511 and 512 are cascade-connected, the CTN terminal may be set high. If a single head driving apparatus is used, the CNT terminal may be set Low. This allows the head driving apparatuses 511 and 512 to be not only used by cascade-connecting the apparatuses 511 and 512 but also used solely. In addition, if the number of CNT terminals increases to allow printing data number to be set at 3n bits, 4n bits, . . . , three or more head driving apparatuses can be cascade-connected.

In this embodiment, the CNT terminals of the printing data number control circuits 561 and 562 in the head driving apparatuses 511 and 512, respectively are set High, and printing data number counted by the corresponding printing data number counters 571 and 572 are set at 2n bits.

A count end signal is outputted from the CO terminal of the printing data number counter 571 and inputted to the K terminal of the JK-FF 591. An output from the Q terminal of the JK-FF 591 is inputted to the LD terminal of the printing data number counter 571 to thereby activate the printing data number counter 571. An output from the Q terminal of the JK-FF 591 is inputted to the n-bit shift register 521 as an enable signal (ENB) through the ENB terminal. Further, an inverted output from the /Q terminal of the JK-FF 591 serves as another input of the two-input AND gate 601 to which the serial data (SDI) inputted from the SDI terminal is inputted as one input. The output of the two-input AND gate 601 is inputted from the LT terminal into the LT terminal of the n-bit latch 531 and to that of the driving waveform forming circuit 541 as a latch signal (LT).

The serial data (SDI) is inputted to the SD terminal and CD terminal of the first head driving apparatus 511. An output from the serial data out terminal (SDO terminal) of the n-bit shift register 521 is inputted to the SD terminal of the second head driving apparatus 512. As can be seen from the above, the input and output of the printing data of the first head driving apparatus 511 and those of the second head driving apparatus 512 are connected by cascade-connection.

The operation of the print head driving apparatus as constituted state above will be described with reference to FIG. 9.

First, when a reset signal (RST) is inputted to the head driving apparatuses 511 and 512, the circuits in the both apparatuses are initiated. If serial data (SDI) is transferred to the head driving apparatuses 511 and 512 synchronously with a common clock signal (CLK) through the SD terminal and CD terminals thereof, the printing data number counters 571 and 572 of the printing data number control circuits 561 and 562 in the head driving apparatuses 511 and 512, respectively, are activated by the first one-bit High data inputted to the CD terminals, and the counters 571 and 572 starts counting data of 2n bits. At the same time, signals (ENB) enabling the n-bit shift registers 521 and 522 rise and printing data is transferred to the n-bit shift register 521 in the first head driving apparatus 511 and the n-bit shift register 522 in the second head driving apparatus 512 in this order.

When the printing data counters 571 and 572 finishes counting the data of 2n bits, count end signals are outputted from the CO terminals of the printing data number counters 571 and 572, respectively. Then, signals for enabling the n-bit shift registers 521 and 522 fall and the n-bit shift registers 521 and 522 hold the printing data at that time.

Meanwhile, if the first one-bit High data of the serial data (SDI) is inputted to the CD terminals of the head driving apparatuses 511 and 512, latch signals (LT) are outputted from the LT terminals of the printing data number control circuits 561 and 562 and then inputted to the n-bit latches 531 and 532, respectively. As a result, the printing data of one count earlier already stored in the n-bit shift registers 521 and 522 are held by the n-bit latches 531 and 532, respectively. It is noted, however, that all of the outputs of the n-bit shift registers 521 are at Low level right after the head driving apparatus 511 is initialized and the n-bit latch 531, therefore, holds zero data.

The latch signal (LT) is also inputted to driving waveform forming circuits 541 and 542. Then, the driving waveform forming circuits 541 and 542 form driving signals (TP) with the latch signals (LT) as a starting point, and whether to carry current or not is selected based on the printing data from the n-bit latches 531 and 532 to thereby output the result in the form of driving waveforms. Thus, driving waveforms are outputted from the output pint DO1 to DOn and the print head is driven by these driving waveforms. Thereafter, every time serial data (SDI) is received, printing operation is repeatedly carried out.

As stated above, by providing the printing data number control circuit 561 and inputting the serial data consisting of printing data, and High data (leading data) and Low data (trailing data) which are put in front of and in back of the printing data, respectively, to the printing data number control circuit 561, the printing data number counter 571 counting the printing data is activated by the leading data and stops data counting when necessary printing data have been stored in the n-bit shift register 521 to thereby allow a latch signal (LT) to be outputted from the printing data number control circuit 561 by the leading High data of the next serial data (SDI). Thus, as in the case of the first embodiment, it is possible to dispense with a control line for applying a latch signal from an external unit and to thereby reduce the number of the overall control lines.

Moreover, since the latch signal (LT) is also inputted to the driving waveform forming circuit 541 and a driving waveform starting from the latch signal (LT) is formed, there is no need to input a driving signal (TP) from an external unit as in the case of the second embodiment and it is, therefore, possible to dispense with a signal line for the driving signal, as well.

Accordingly, the side of controlling the head driving apparatuses 511 and 512 can carry out printing operation only by adding data of as low as two bits to the printing data, thereby facilitating control.

The above-stated advantages can be obtained if a head driving apparatus is solely used as in the case of using a plurality of head driving apparatuses 511 and 512 by cascade-connecting them.

Moreover, in this embodiment, if the head driving apparatuses 511 and 512 are cascade-connected, the enable signal inclusive n-bit shift register 521 is provided at the head driving apparatus 511. If the leading data of the serial data (SDI) is inputted to the printing data number control circuit 561, a signal (ENB) for enabling the n-bit shift register 521 rises. When the printing data number counter 571 finishes data counting, a signal (ENB) for enabling the n-bit shift register 521 falls and the printing data is thereby held. Thus, it is possible to prevent the printing data for driving the first head driving apparatus 511 from being inputted from the serial data out terminal to the second head driving apparatus 512.

In addition, the number of printing data counted by the printing data number counters 571 and 572 of the printing data number control circuits 561 and 562 in the head driving apparatuses 511 and 512, respectively are set at 2n bits, and the serial data (SDI) is simultaneously inputted to the printing data number control circuits 561 and 562 in the head driving apparatuses 511 and 512, respectively. By doing so, it is enough to input only one serial data (SDI) consisting of printing data including the second printing data for driving the second head driving apparatus 512 and the first printing data for driving the first driving apparatus 511 in this order, and it is not necessary to input different printing data to the head driving apparatuses 511 and 512.

Fourth Embodiment

Next, description will be given to the fourth embodiment in which the present invention is applied to a case where two head driving apparatuses are cascade-connected, with reference to FIGS. 10 and 11. It is noted that the same constituent elements as those shown in FIG. 7 are denoted by the same reference symbols and that description will not be given thereto herein.

Figure 10:
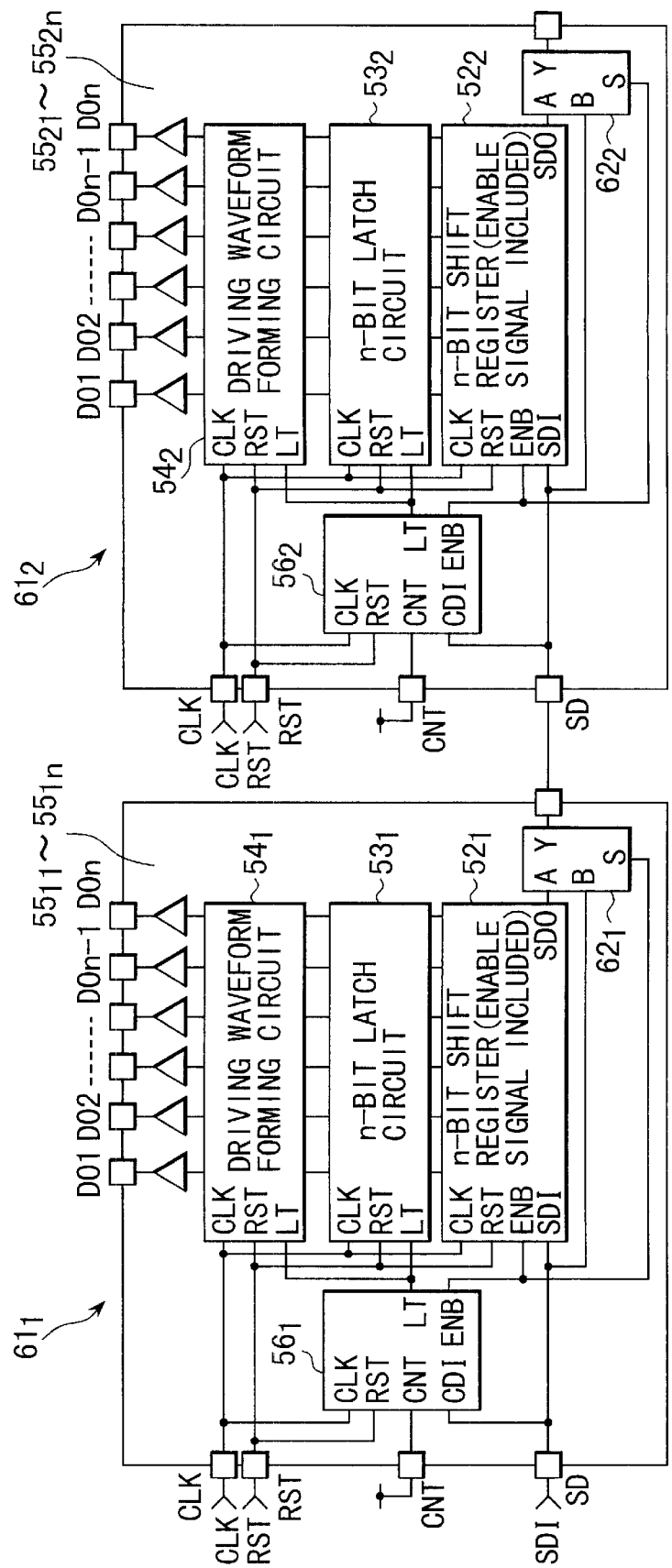
FIG. 10 is a circuit block diagram showing a constitution of a print head driving apparatus in the fourth embodiment according to the present invention.
Figure 11:
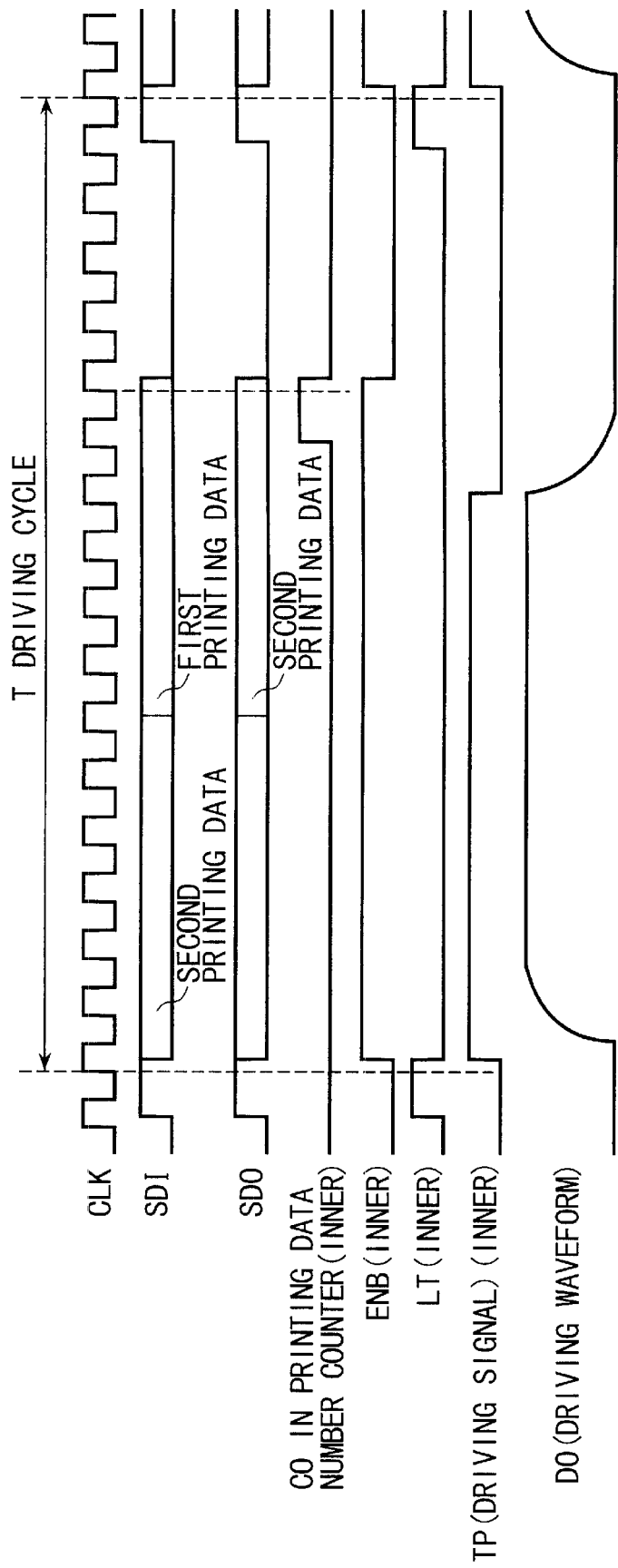
FIG. 11 is a timing chart showing the operational timing of the print head driving apparatus shown in FIG. 10.

FIG. 10 is a block diagram showing the constitution of a head driving apparatus in this embodiment and FIG. 11 is a timing chart showing the control of this apparatus.

Since the head driving apparatuses in this embodiment are the same in constitution, the first head driving apparatus 611 will be typically described. For the convenience of illustration, a subscript 1 is added to the constituent elements in the first head driving apparatus 611 and a subscript 2 is added to those in the second head driving apparatus 612.

The first head driving apparatus 611 in this embodiment differs from that shown in FIG. 7 in that an SD terminal for inputting serial data (SDI) is connected to the CDI terminal of a printing data number control circuit instead of inputting serial data (SDI) from the CD terminals of the respective head driving apparatuses 511 and 512 and that a selector circuit 621 is provided for selecting one of the serial data (SDI) from this SD terminal and the serial data (SDI) from the SDO terminal of the n-bit shift register 521 based on an ENB signal from the printing data number control circuit 561.

Specifically, the selector circuit 621 selects the serial data (SDI) inputted through a B terminal from the SD terminal of the first head driving apparatus 611 and outputs the serial data (SDI) from a Y terminal when the ENB signal inputted to a select terminal (S) from the printing data number control circuit 561 is Low. The selector circuit 621 selects the serial data (SDI) inputted through an A terminal from the SDO terminal of the n-bit shift register 521 and outputs the serial data (SDI) from the Y terminal when the ENB signal from the printing data number control circuit 561 is High.

In such first head driving apparatus 611 in this embodiment, the output of the selector circuit 621 is inputted to the second head driving apparatus 612 through an SD terminal thereof.

In this embodiment, as in the case of the third embodiment, the CNT terminals of the printing data number control circuits 561 and 562 in the head driving apparatuses, respectively, are set High and the number of printing data to be counted by the printing data number counters 571 and 572 are set at 2n bits.

The operation of the print head driving apparatus as constituted state above will be described with reference to FIG. 11.

First, when reset signals (RST) are inputted to the head driving apparatuses 611 and 612, respectively, the circuits in the apparatuses are initialized. If the serial data (SDI) is transferred through the SD terminal to the first head driving apparatus 511 synchronously with one common clock signal (CLK), the first one-bit High data in the serial data (SDI) is also inputted to the SD terminal of the second head driving apparatus 612 through the selector circuit 621 due to the fact that the select terminal (S) of the selector circuit 621 in the first head driving apparatus 611 is Low.

The printing data number counters 571 and 572 in the head driving apparatuses 611 and 612, respectively, are activated by the first one-bit High data. Then, the counters 571 and 572 starts counting data of 2n bits and, at the same time, signals (ENB) for enabling the n-bit shift registers 521 and 522 rise. Thus, printing data is transferred to the n-bit shift register 521 of the first head driving apparatus 611 and to the n-bit shift register 522 of the second head driving apparatus 612 in this order.

At this moment, the select terminal of the selector circuit 621 in the first head driving apparatus 511 is High and an output from the SDO terminal of the n-bit shift register 521 is inputted to the second head driving apparatus 612.

If the printing data number counters 571 and 572 finish counting data of 2n bits, then count end signals are outputted from the CO terminals of the printing data number counters 571 and 572, respectively, signals (ENB) for enabling the n-bit shift registers 521 and 522 fall, respectively and the n-bit shift registers 521 and 522 hold the printing data at that time.

Meanwhile, if the first one-bit High data in the serial data (SDI) is inputted to the CD terminals of the printing data number control circuits 561 and 562 in the head driving apparatuses 611 and 612, respectively, latch signals (LT) are outputted from the LT terminals of the printing data number control circuits 561 and 562 and inputted to n-bit latches 531 and 531, respectively. As a result, the printing data of one count earlier already stored in the n-bit shift registers 521 and 522 are held by the n-bit latches 531 and 532, respectively. It is noted, however, that all of the outputs of the n-bit shift register 521 are Low right after the head driving apparatus 611 has been initialized and that the n-bit shift latch 531 therefore holds zero data.

The latch signals (LT) are also inputted to driving waveform forming circuits 541 and 542, respectively. Then, the driving waveform forming circuits 541 and 542 form driving signals (TP) with each latch signal (LT) as a starting point, whether to carry current or not is selected based on the printing data from the n-bit latches 531 and 532, respectively and the results are outputted as driving waveforms. By doing so, output pins DO1 to DOn output driving waveforms by which a print head is driven. Thereafter, every time serial data (SDI) is received, printing operation is repeatedly carried out.

As described above, in this embodiment, the number of printing data to be counted by the printing data number counters 571 and 572 in the head driving apparatuses 611 and 612, respectively are set at 2n bits. If the serial data (SDI) is inputted to the first head driving apparatus 611, the selector circuit 621 allows the leading data in the serial data (SDI) to be inputted to the second head driving apparatus 612, as well. Then, the printing data number counters 571 and 572 in the head driving apparatuses 611 and 612, respectively are simultaneously activated, whereby it is possible to dispense with a signal line for applying a latch signal from an external unit and that for a driving signal. Besides, the side of controlling the head driving apparatuses 611 and 612 can perform printing operation only by adding data of as low as two bits to the printing data, thereby facilitating control. In this way, the fourth embodiment can provide the same advantages as those of the third embodiment. Moreover, in this embodiment, it is enough to input serial data (SDI) only from the SD terminal of the first head driving apparatus 611, so that it is possible to dispense with a CD terminal for inputting the serial data (SDI) for each of the head driving apparatuses 611 and 612.

Fifth Embodiment

Next, description will be given to the fifth embodiment in which the present invention is applied to a case where two head driving apparatus are cascade-connected, with reference to FIGS. 12 through 14. It is noted that the same constituent elements as those shown in FIG. 7 are denoted by the same reference symbols and that detailed description will not be given thereto herein.

Figure 12:
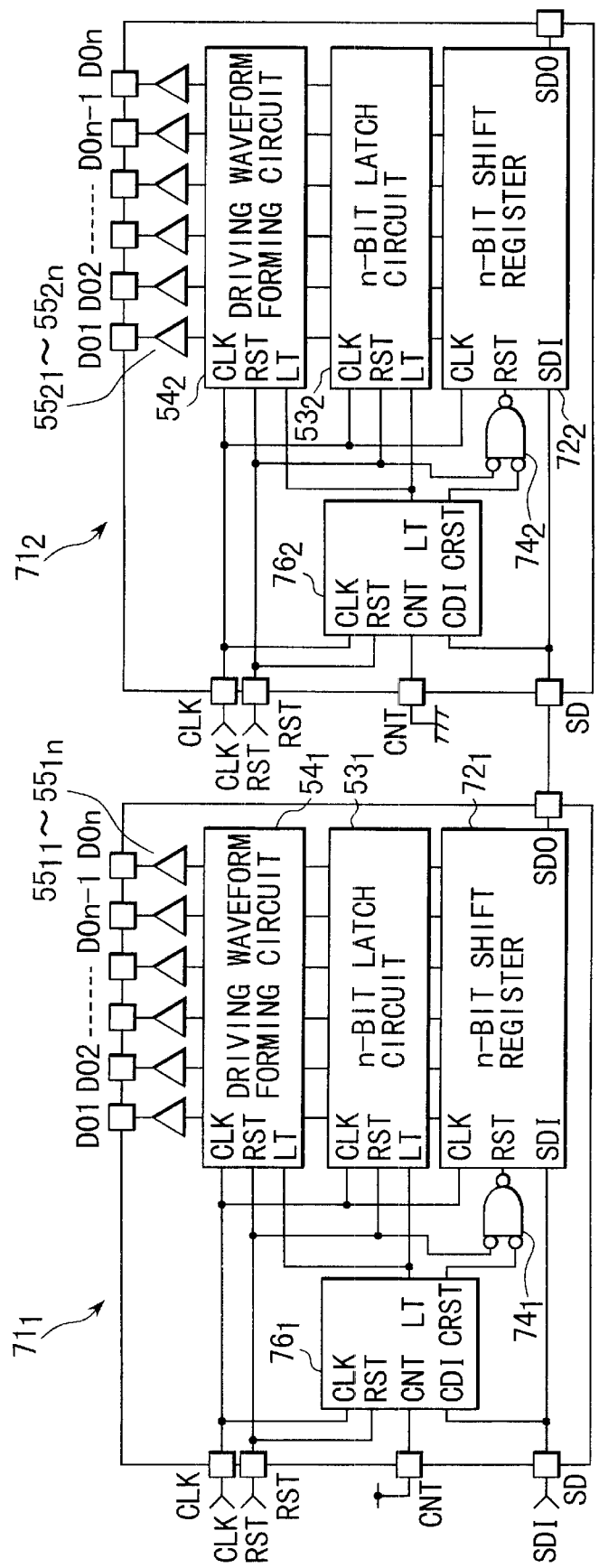
FIG. 12 is a circuit block diagram showing a constitution of a print head driving apparatus in the fifth embodiment according to the present invention.
Figure 14:
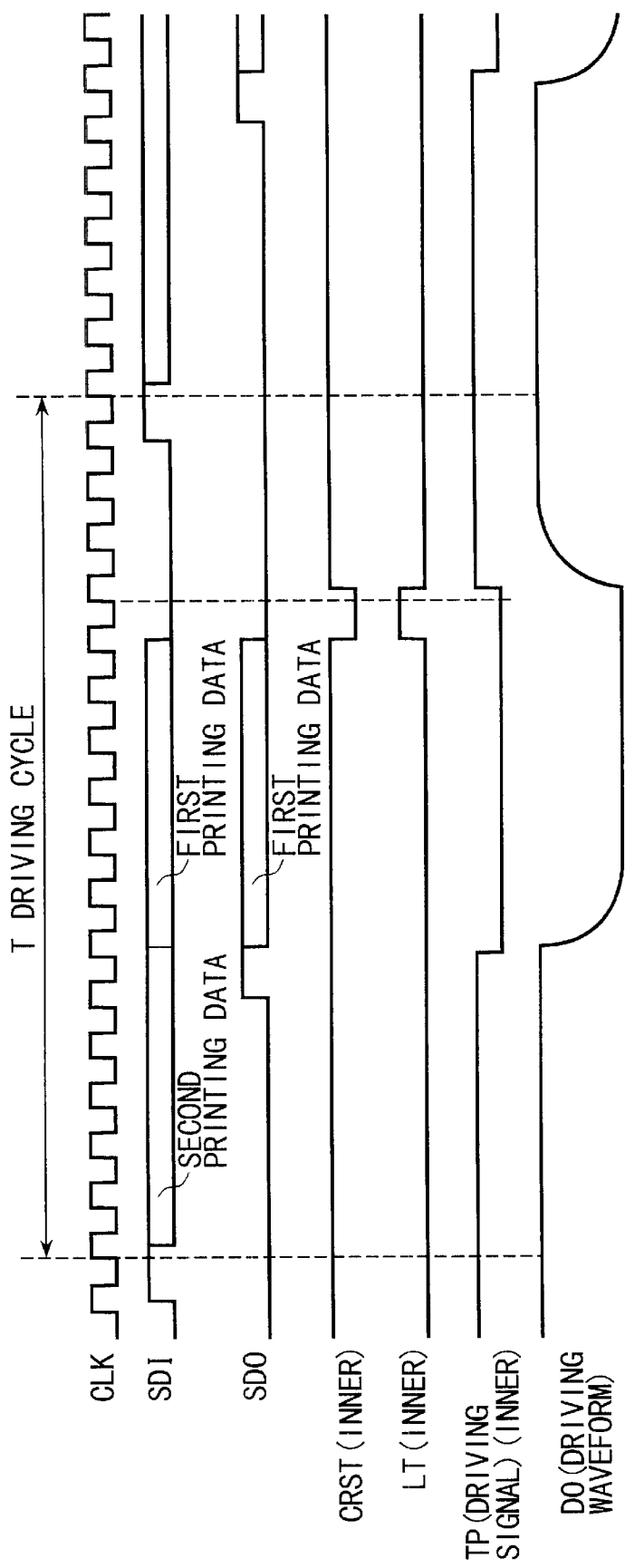
FIG. 14 is a timing chart showing the operational timing of the print head driving apparatus shown in FIG. 12.

FIG. 12 is a block diagram showing the constitution of a head driving apparatus in this embodiment and FIG. 14 is a timing chart showing the control of this apparatus.

Since head driving apparatuses in this embodiment are the same in constitution, the first head driving apparatus 711 will be typically described. For the convenience of illustration, a subscript 1 is added to the constituent elements in the first head driving apparatus 711 and a subscript 2 is added to those in the second driving apparatus 712.

The first head driving apparatus 711 in this embodiment differs from that shown in FIG. 7 is that an n-bit shift register 721 without an enable signal is used and that an n-bit shift register 721 is reset simultaneously when a latch signal (LT) is outputted from the printing data number control circuit 761.

Figure 13:
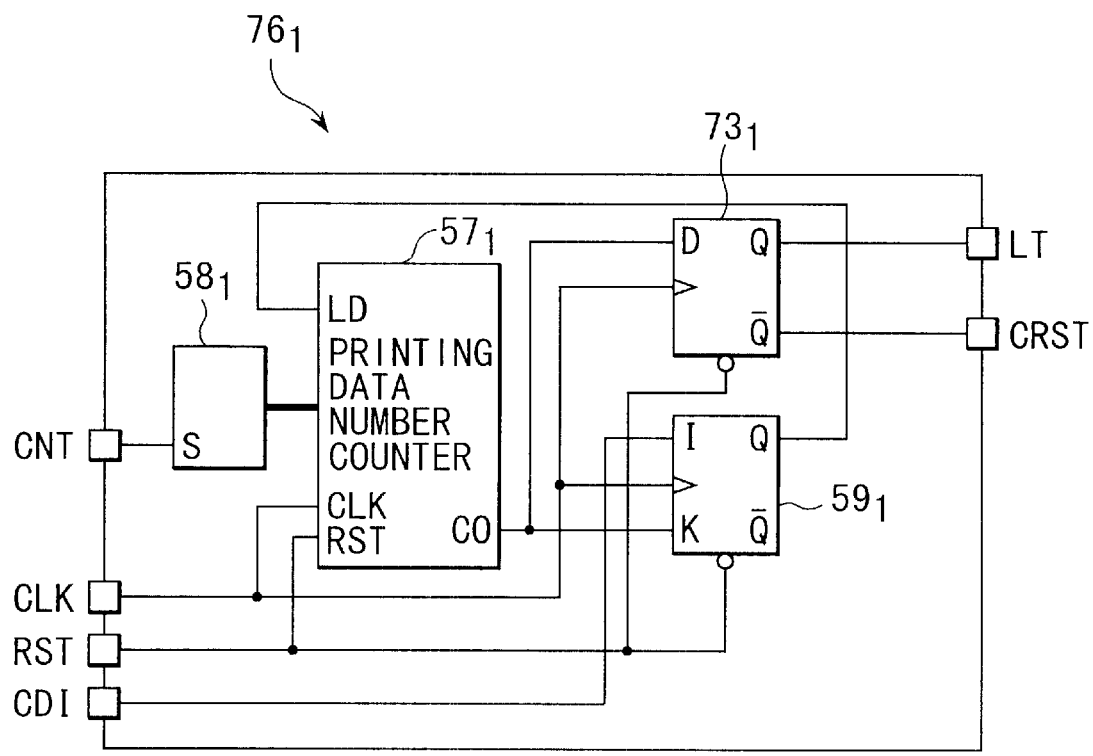
FIG. 13 is a circuit block diagram showing the constitution of a printing data number control circuit shown in FIG. 12.

Specifically, as shown in FIG. 13, the printing data number control circuit 761 is provided with a D-FF 731, the CO terminal of the printing data number counter 571 is connected to the D terminal of the D-FF 731, an output from a Q terminal is inputted to the LT terminal of an n-bit latch 531 as a latch signal (LT) and an output from a terminal /Q is inputted as a reset signal (CRST) through a NOR gate 741 to the RST terminal of the n-bit shift register 721.

This embodiment also differs from the third embodiment as follows. In the third embodiment, the number of printing data to be counted by the printing data number counters 571 and 572 in the head driving apparatuses 511 and 512, respectively are set at 2n bits, serial data (SDI) is inputted from the CD terminals of the head driving apparatuses 511 and 512, respectively and the printing data number counters 571 and 572 in the head driving apparatuses 511 and 512 are simultaneously activated. In this embodiment, by contrast, the number of printing data to be counted by the printing data number counters 571 and 572 are set at 2n bits and n bits, respectively and the SD terminals for inputting the serial data (SDI) are connected to the CDI terminals of the printing data number control circuits 761 and 762. By doing so, when the serial data (SDI) is inputted from the SD terminal of the first head driving apparatus 711, the printing data number counter 571 is activated. Thereafter, when the serial data (SDI) from the SDO terminal of the first head driving apparatus 711 is inputted to the SD terminal of the second head driving apparatus 712, the printing data number counter 572 is activated.

The operation of the print head driving apparatus as constituted state above will be described with reference to FIG. 14.

First, when reset signals (RST) are inputted to the head driving apparatuses 711 and 712, respectively, the circuits in the apparatuses are initialized. If serial data (SDI) is inputted through the SD terminal of the first head driving apparatus 711 synchronously with one common clock signal (CLK), the printing data number counter 571 of the first head driving apparatus 711 is activated by the first one-bit High data and the counter 571 starts counting data of 2n bits.

The serial data (SDI) is transferred to the n-bit shift register 721 in the first head driving apparatus 711 and then outputted from the SDO terminal.

Thereafter, if the serial data (SDI) from the SDO terminal of the first head driving apparatus 711 is inputted from the SD terminal of the second head driving apparatus 712, the printing data number counter 572 in the second head driving apparatus 722 is activated by the first one-bit High data and the counter 572 thereby starts counting data of n bits When the printing data number counter 571 in the first head driving apparatus 711 finishes counting data of 2n bits, a count end signal is outputted from the CO terminal of the printing data number counter 571 to thereby stop the printing data number counter 571. In addition, when the printing data number counter 572 in the second head driving apparatus 712 finishes counting data of n bits, a count end signal is outputted from the CO terminal of the printing data number counter 572 to thereby stop the printing data number counter 572.

In this way, when the count end signals are outputted from the CO terminals of the printing data number counters 571 and 572, respectively, latch signals (LT) are outputted from the LT terminals of the printing data number control circuits 761 and 762 at the rise of a clock signal (CLK) following the stop of the printing data number counters 571 and 572, respectively. The latch signals (LT) are inputted to the n-bit latches 531 and 532, respectively. As a result, the printing data of the n-bit shift registers 721 and 722 are held by the n-bit latches 531 and 532, respectively.

Furthermore, the latch signals (LT) are also inputted to the driving waveform forming circuits 541 and 542, respectively. Then, the driving waveform forming circuits 541 and 542 form driving signals (TP) with each latch signal (LT) as a starting point. Whether to carry current or not is selected based on the printing data from the n-bit latches 531 and 532, respectively and the results are outputted as driving waveforms to thereby output driving waveforms from the output pins DO1 to DOn. The driving waveform drive print head. Thereafter, every time serial data (SDI) is received, printing operation is repeatedly carried out.

Meanwhile, when the count end signals are outputted from the CO terminals of the printing data number counters 571 and 572, reset signals (CRST) are outputted from the CRST terminals of the printing data number control circuits 761 and 762 at the rise of a clock following the stop of the counters and then inputted to the n-bit shift registers 721 and 722, respectively. By doing so, the n-bit shift registers 721 and 722 are reset in a synchronous manner. If the n-bit shift registers 721 and 722 in the head driving apparatuses 711 and 712 are not reset at timing at which the latch signals (LT) are outputted, the data in the n-bit shift register 721 of the first head driving apparatus 711 is transferred to the second head driving apparatus 712. Moreover, if High data is inputted to the second head driving apparatus 712, the printing. data number counter 572 in the second head driving apparatus 712 is activated again to thereby cause malfunction. Thus, the above series of operation are conducted to prevent the potential malfunction.

Even with the above-stated constitution, it is possible to dispense with signal lines for applying latch signals and driving signals from external units. Besides, the side of controlling the head driving apparatuses 711 and 712 can perform printing operation only by adding data of as low as two bits to the printing data, thereby facilitating control. Hence, the fifth embodiment can provide the same advantages as those of the third embodiment.

Furthermore, in this embodiment, it is enough to input serial data (SDI) only from the SD terminal of the first head driving apparatus 711, so that it is possible to dispense with a CD terminal for inputting serial data (SDI) for each of the head driving apparatuses 711 and 712.

In this embodiment, description has been given to a case where the printing data number counters 571 and 572 can be set at two different types of bits, i.e., n bits and 2n bits at the CNT terminals of the printing data number control circuits 761 and 762. It is noted, however, the present invention should not be limited thereto. It is possible to cascade-connect three or more apparatuses if the number of CNT terminals of the printing data number control circuits 761 and 762 is increased to allow dealing with more data. In the latter case, the number m of the print head driving apparatuses to be connected later is multiplied by the number 1 of the original apparatus, and the resultant value (m+1)×n is set as the count number of the print data number counter in the printing data extracting means. Thus, different settings may be made for the respective print head driving apparatuses. Further, the printing data included in the serial data at this time may be arranged in such an order that the print data of the print head driving apparatus connected at a termination is put as leading data to make the printing data for printing the later connected print head driving apparatus put earlier.

Sixth Embodiment

Next, description will be given to the sixth embodiment in which the present invention is applied to a case where two head driving apparatuses are cascade-connected, with reference to FIGS. 15 and 16.

Figure 15:
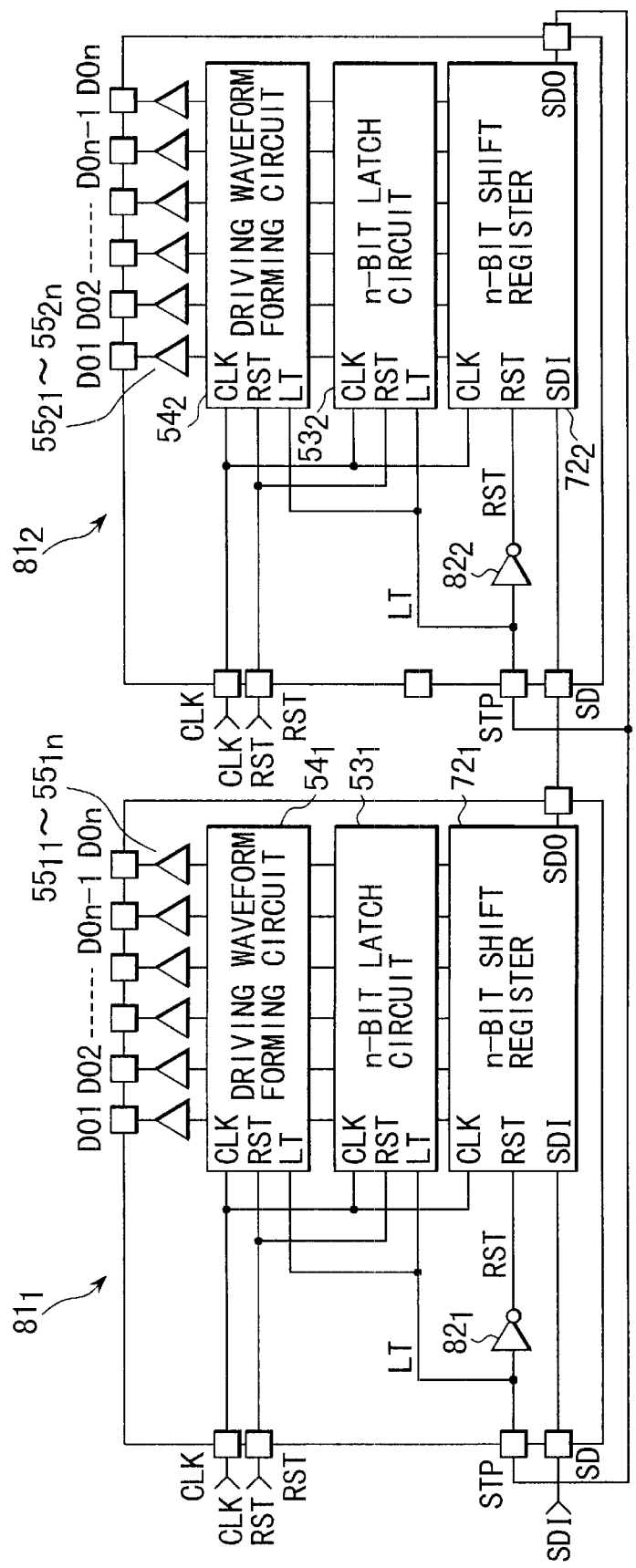
FIG. 15 is a circuit block diagram showing the constitution of a print head driving apparatus in a sixth embodiment according to the present invention.
Figure 16:
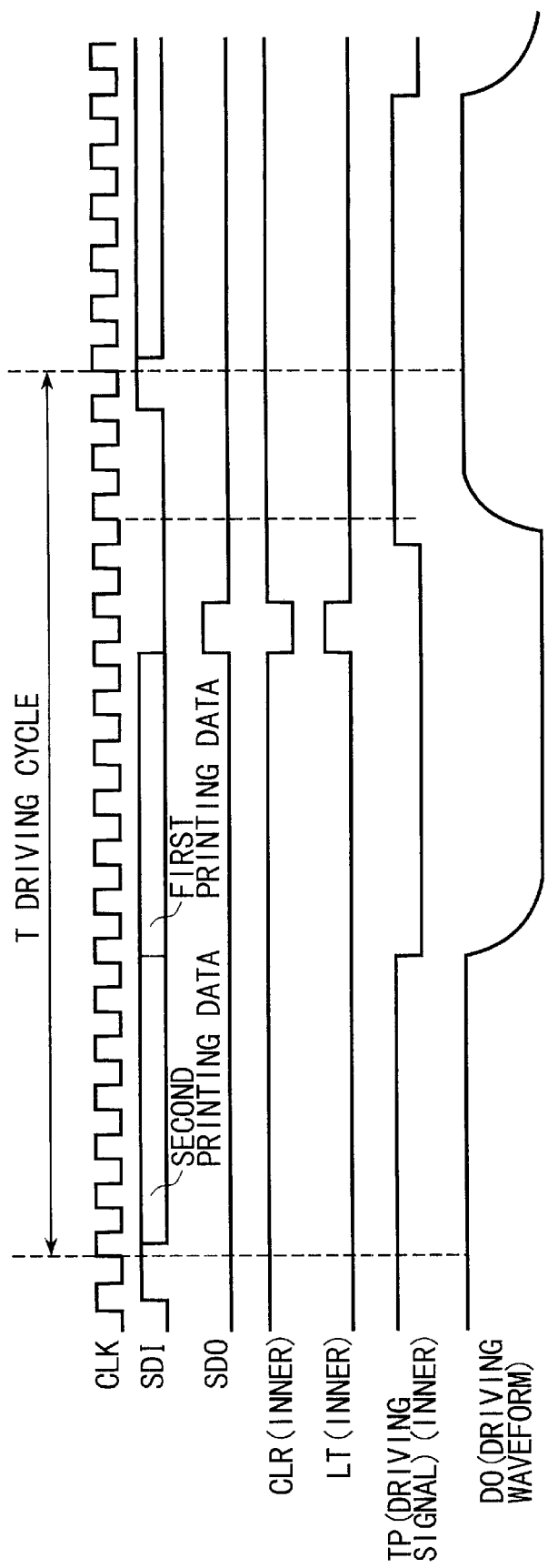
FIG. 16 is a timing chart showing the operational timing of the print head driving apparatus shown in FIG. 15.

FIG. 15 is a block diagram showing the constitution of a head driving apparatus in this embodiment and FIG. 16 is a timing chart showing the control of this apparatus. It is noted that the same constituent elements as those shown in FIG. 12 are denoted by the same reference symbols and that description will not be given thereto herein.

Since the head driving apparatuses in this embodiment are the same in constitution, the first head driving apparatus 811 will be typically described. For the convenience of illustration, a subscript 1 is added to the constituent elements in the first head driving apparatus 811 and a subscript 2 is added to those in the second head driving apparatus 812.

The first head driving apparatus 811 in this embodiment differs from that shown in FIG. 12 is that an STP terminal instead of the printing data number control circuit 761 is provided, an input from which is inputted as a latch signal (LT) to an n-bit latch 531 and to the LT terminal of a driving waveform forming circuit 541 and inputted to the CLR terminal of an n-bit shift register 721 through an inverter 821 and that an output from the SDO terminal of an n-bit shift register 722 in the second head driving circuit 812 is fed back to be inputted to the STP terminals of the head driving apparatuses 811 and 812, respectively. By doing so, the leading data in the serial data (SDI) inputted from the SD terminal of the first head driving apparatus 811 is fed back to be inputted from the STP terminals of the head driving apparatuses 811 and 812, respectively.

The operation of the print head driving apparatus constituted as stated above will be described with reference FIG. 16.

First, when reset signals (RST) are inputted to the head driving apparatuses 811 and 812, respectively, the circuits in the apparatuses are initialized. When serial data (SDI) is inputted through the SD terminal of the first head driving apparatus 811 synchronously with one common clock signal (CLK), the serial data (SDI) is inputted to the n-bit shift register 721 in the first head driving apparatus 811 and then inputted to the SD terminal of the second head driving apparatus 812 from the SDO terminal of the n-bit shift register 721. The leading High data is then outputted from the SDO terminal of the n-bit shift register 722 in the second head driving apparatus 812.

Thereafter, if the leading High data is inputted from the SDO terminal of the n-bit shift register 722 in the second head driving apparatus 812 to the STP terminals of the head driving apparatuses 811 and 812, respectively, the printing data which have been stored in the corresponding n-bit shift registers 721 and 722 by the High data at the rise of the next clock, are latched by n-bit latches 531 and 532, respectively. At this moment, since inverters 821 and 822 are Low, the n-bit shift registers 721 and 722 are cleared in a synchronous manner. If the n-bit shift registers 721 and 722 are not cleared at that moment, the earlier data is outputted when the next serial data (SDI) is inputted, thereby causing malfunction. The above series of operation are carried out to prevent the potential malfunction.

If the leading High data from the SDO terminal of the n-bit shift register 722 in the second head driving apparatus 812 is inputted to the STP terminals of the head driving apparatuses 811 and 812, respectively, driving signals (TP) with each leading High data inputted to the LT terminal as a starting point, are formed in the driving waveform forming circuits 541 and 542 at the rise of the next clock by the High data. Then, whether to carry current or not is selected based on the printing data from the n-bit latches 531 and 532 and the results are outputted as driving waveforms. As a result, driving waveforms are outputted from output pins DO1 to DOn in the respective apparatuses to thereby drive the print head. Thereafter, every time serial data (SDI) is received, printing operation is repeatedly carried out.

Even with the above constitution, it is possible to dispense with signal lines for applying latch signals and driving signals from external units. Besides, the side of controlling the head driving apparatuses 811 and 812 can carry out printing operation only by adding data of as low as one bit to the printing data, thereby facilitating control. Hence, this embodiment can provide the same advantages as those of the third embodiment.

Furthermore, in this embodiment, it is possible to dispense with a printing data number control circuit and to, therefore, reduce the number of parts.

It is noted that it is possible to use the head driving apparatuses in this embodiment solely or to cascade-connect three or more apparatuses. In the latter case, the SDO terminal of the head driving apparatus in the last stage may be connected to the STP terminals of the respective head driving apparatuses.

Moreover, in the above-stated embodiments, description has been given to a case where a pixel in the printing data consists of one bit. However, the present invention should not be limited thereto. Even gradation code data can be provided by combining the transfer number of data to the n-bit shift registers 721 and 722.

Seventh Embodiment

Next, description will be given to the seventh embodiment in which the present invention is applied to a case where two head driving apparatuses are cascade-connected, with reference to FIGS. 17 through 19.

Figure 17:
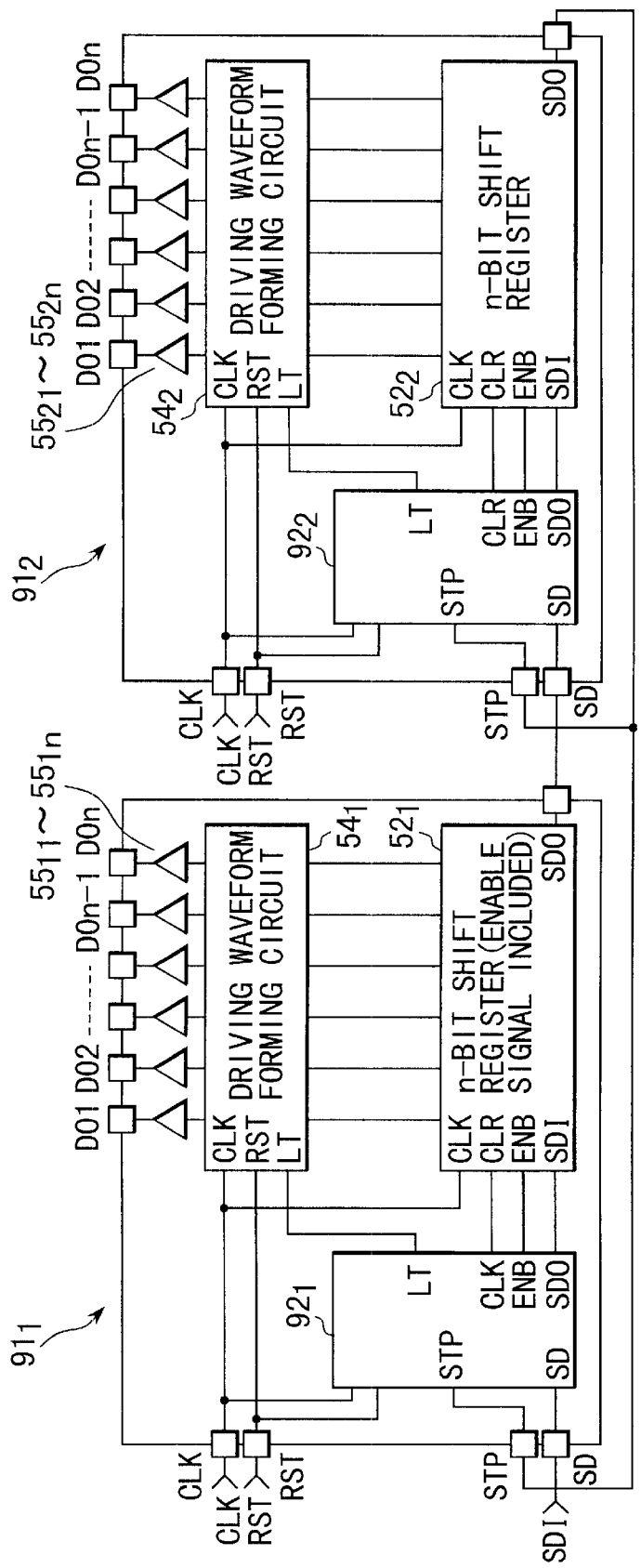
FIG. 17 is a circuit block diagram showing the constitution of a print head driving apparatus in a seventh embodiment according to the present invention.
Figure 19:
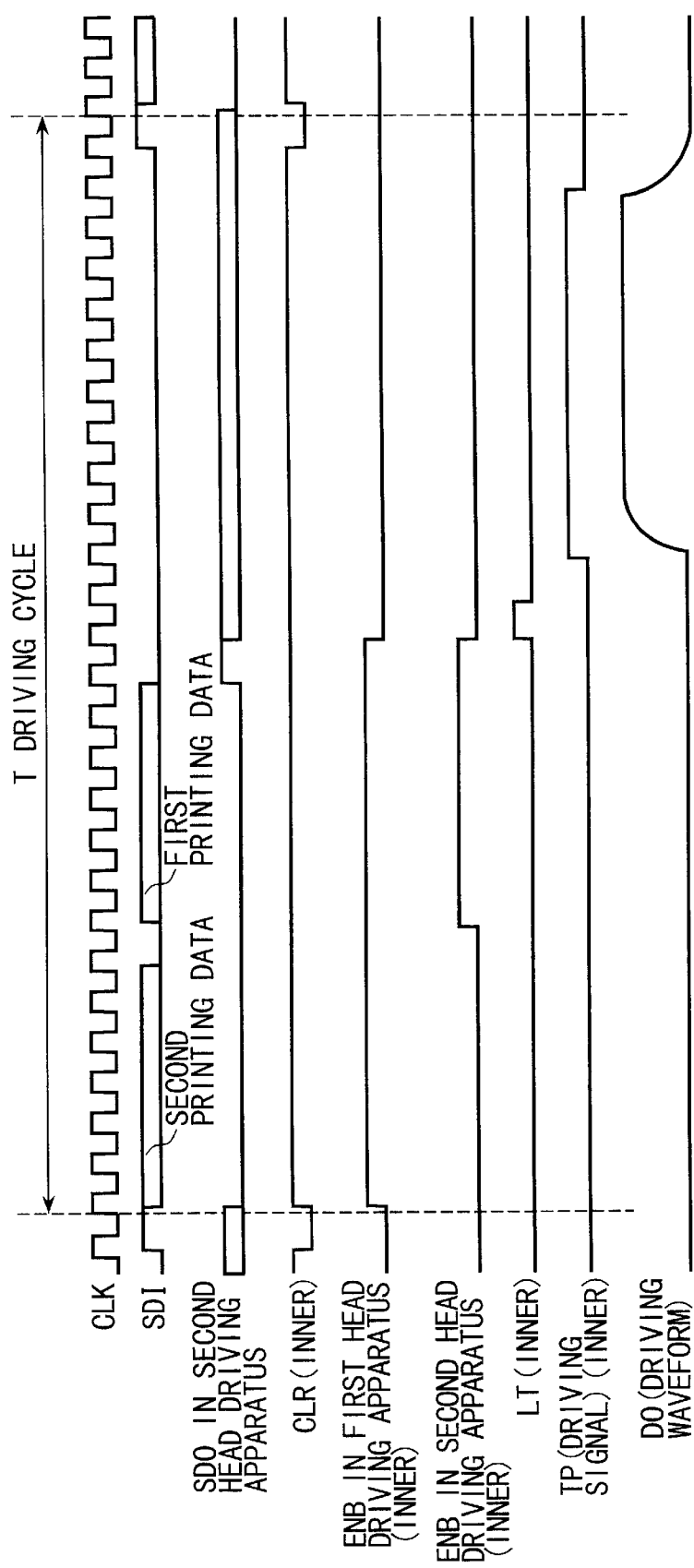
FIG. 19 is a timing chart showing the operational timing of the print head driving apparatus shown in FIG. 17.

FIG. 17 is a block diagram showing the constitution of a head driving apparatus in this embodiment and FIG. 19 is a timing chart showing the control of the present invention. It is noted that this embodiment is useful to a case where data transfer does not overlap with a driving signal within a driving cycle as shown in the timing chart of FIG. 17.

Since head driving apparatuses in this embodiment are the same in constitution, the first head driving apparatus will be typically described. For the convenience of illustration, a subscript 1 is added to the constituent elements in the first head driving apparatus 911 and a subscript 2 is added to the constituent elements in the second head driving apparatus 912. The same elements as those shown in FIG. 7 are denoted by the same reference symbols and will not be described in detail herein.

The first head driving apparatus 911 in this embodiment differs from that in the third embodiment in that an n-bit latch 531 is not provided and an n-bit shift register 521 is enabled only when printing data is valid and that a printing data number counter 571 is not provided and a printing data extracting circuit 921 instead of the printing data number control circuit 561 is provided as printing data extracting means.

Figure 18:
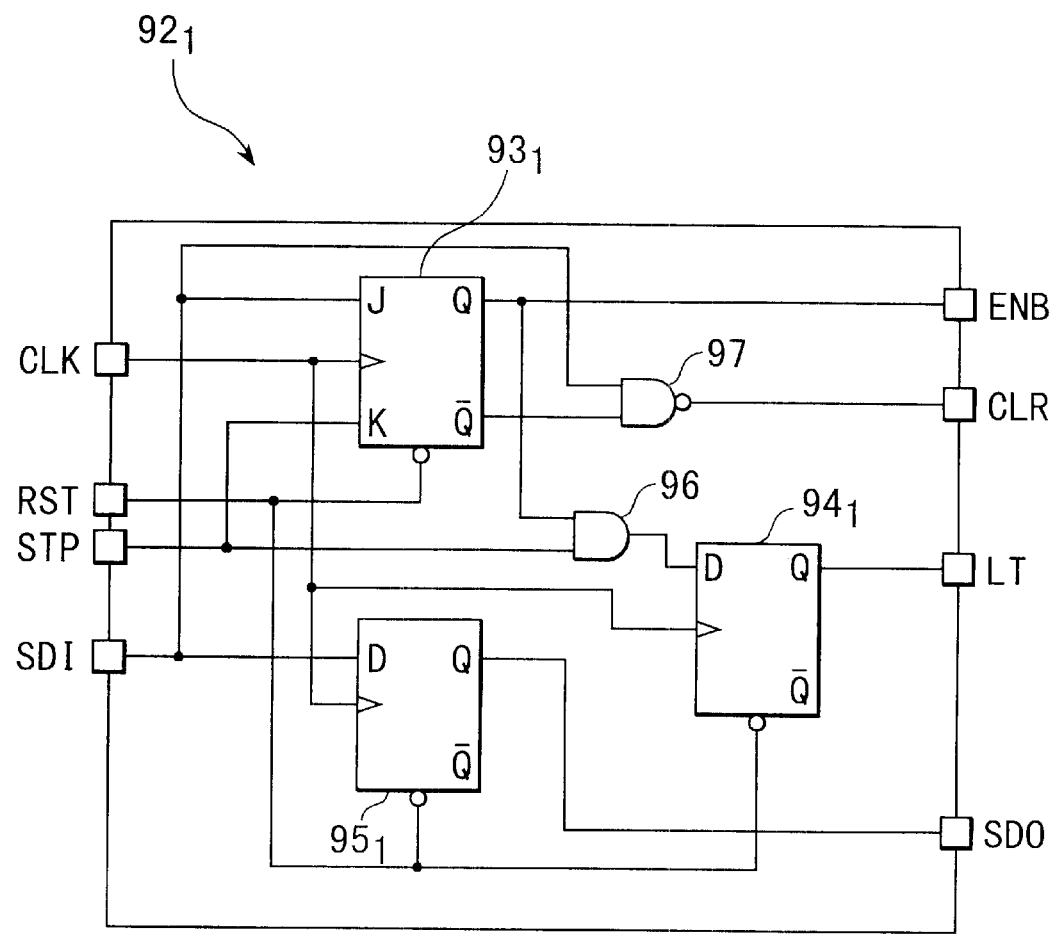
FIG. 18 is a circuit block diagram showing the constitution of a print data extracting circuit shown in FIG. 17.

Specifically, the printing data extracting circuit 921 is provided with a JK-FF 931, two D-FFS 941, 951 as shown in FIG. 18. A clock signal (CLK) inputted from a CLK terminal is inputted to the CLK terminals of the JK-FF 931, D-FFs 941 and 951, respectively. A reset signal (RST) inputted from an RST terminal is inputted to the RST terminals of the JK-FF 931, D-FF 941 and 951, respectively. Serial data (SDI) inputted from an SD terminal is inputted to the J terminal of the JK-FF 931. An output from the SDO terminal of the n-bit register 522 in the second head driving apparatus 912 via the STP terminal is inputted to the K terminal of the JK-FF 931.

An output from the Q terminal which is the output terminal of the JK-FF 931 is inputted from an ENB terminal to the ENB terminal of the n-bit shift register 521. An output from the Q terminal which is the output terminal of the JK-FF 931 is also inputted to an AND gate 96 together with an input from the STP terminal, and the output of the AND gate 96 is inputted to the D terminal of the D-FF 931. Further, an output from the /Q terminal which is the inverted output terminal of the JK-FF 931 is inputted to a two-input NAND gate 97 together with the serial data from the SD terminal. The output of the two-input NAND gate 97 is inputted to the CLR terminal of the n-bit shift register 521 from a CLR terminal.

An output from the Q terminal which is the output terminal of the D-FF 941 is inputted from the LT terminal of the circuit 921 to the LT terminal of a driving waveform forming circuit 541. An output from the Q terminal which is the output terminal of the D-FF 951 is inputted from the SDO terminal of the circuit 921 to the SDI terminal of the n-bit shift register 521.

The serial data (SDI) inputted from the SD terminal of the first head driving apparatus 911 in this embodiment is constituted such that the first printing data for driving the first head driving apparatus 911 is coupled to the second printing data for driving the second driving apparatus 912 by one-bit Low data, one-bit High data is put in front of the first printing data and Low data is put in back of the second printing data. The reason for putting the Low data between the second printing data and the first printing data is as follows. Since the n-bit shift register 521 is enabled only when the printing data is valid and data next to the leading High data and the following data are inputted to the n-bit shift register 521, the leading High data is not inputted to the second head driving apparatus 912. Thus, the printing data extracting circuit 921 is provided with the D-FF 951 and the Low data is, therefore, put between the second printing data and the first printing data to adjust one bit.

The output from the SDO terminal of the n-bit shift register 522 in the second head driving apparatus is fed back to be inputted to the STP terminals of the head driving apparatuses 911 and 912, respectively. By doing so, the leading High data is fed back from the second head driving apparatus 912 and inputted from the STP terminals of the head driving apparatuses 911 and 912, respectively.

The operation of the print head driving apparatus constituted as stated above will be described with reference to FIG. 19.

First, when reset signals (RST) are inputted to the head driving apparatuses 911 and 912, respectively, the circuits in the apparatuses are initialized. When serial data (SDI) is inputted through the SD terminal of the first head driving apparatus 911 synchronously with one common clock signal (CLK), a clear signal (CLR) is inputted to the n-bit shift register 521 and all of the data in the n-bit shift register 521 are turned to Low by the first High data. In addition, the ENB terminal is turned to High by the first High data and the n-bit shift register 521 becomes valid. Then, the printing data in the serial data (SDI) passes the D-FF 951 in the printing data extracting circuit 921 and then inputted to the n-bit shift register 521.

If the printing data passes through the n-bit shift register 521 in the first head driving apparatus 911 and inputted from the SDO terminal of the register 521 to the SD terminal of the printing data extracting circuit 922 in the second head driving apparatus 912, then the printing data is inputted to the n-bit shift register 522 in the second head driving apparatus 912 by the same operation as that of the first head driving apparatus 911.

Thereafter, if outputted from the SDO terminal of the second head driving apparatus 912, the first High data is inputted to the STP terminals of the head driving apparatuses 911 and 912, respectively. In the printing data extracting circuits 921 and 922, the enable signals (ENB) of the n-bit shit registers 541 and 542 are turned into Low, the shift operations of the n-bit shift registers 541 and 542 are stopped and printing data are held by the registers.

Further, at the rise of the next clock, latch signals (LT) are outputted from the LT terminals of the printing data extracting circuits 921 and 922 and inputted to the LT terminals of the driving waveform forming circuits 541 and 542, respectively. Then, the driving waveform forming circuits 541 and 542 form driving signals (TP) with each latch signal (LT) as a starting point. Whether to carry current or not is selected based on the printing data from the n-bit shift registers 541 and 542 and the results are outputted as driving waveforms. As a result, driving waveforms are outputted from the output pins DO1 to DOn, respectively, which waveforms drive a print head. Thereafter, every time serial data (SDI) is received, printing operation is repeatedly carried out.

Even with the above-stated constitution, it is possible to dispense with signal lines for applying latch signals and driving signals from external units. Besides, the side of controlling the head driving apparatuses 911 and 912 can carry out printing operation only by adding data of as low as three bits to the printing data, thereby facilitating control. Hence, this embodiment can provide the same advantages as those of the third embodiment.

Further, in this embodiment, it is possible to dispense with an n-bit latch and a printing data number counter and to, therefore, reduce the number of parts.

It is noted that the head driving apparatuses in this embodiment may be used solely or three or more apparatuses may be cascade-connected. In the latter case, the SDO terminal of the head driving apparatus in the last stage may be connected to the STP terminals of the respective head driving apparatuses.

Eighth Embodiment

Next, description will be given to the eighth. embodiment in which the present invention is applied to a case where a plurality of head driving apparatuses in the second through seventh embodiments stated above are used, independently of each other, for a tandem type color printer, with reference to FIGS. 20 and 21.

Figure 20:
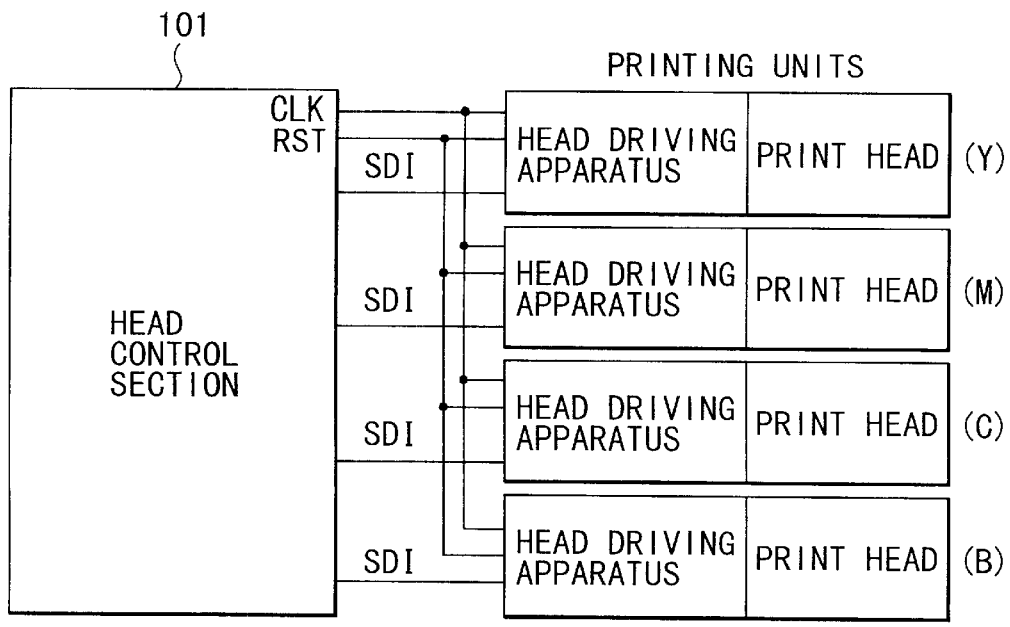
FIG. 20 is a circuit block diagram showing the constitution of important parts of a printer in an eighth embodiment according to the present invention.

FIG. 20 is a block diagram showing a head control section 101 through the print heads of respective printing units. FIG. 21 is a control timing chart.

The head control section 101 and the head driving apparatuses of the respective printing units are connected by a total of six signal lines, i.e., a clock signal (CLK) common to the printing units, signal lines for inputting a reset signal (RST) and those for inputting serial data to the printing units.

Figure 21:
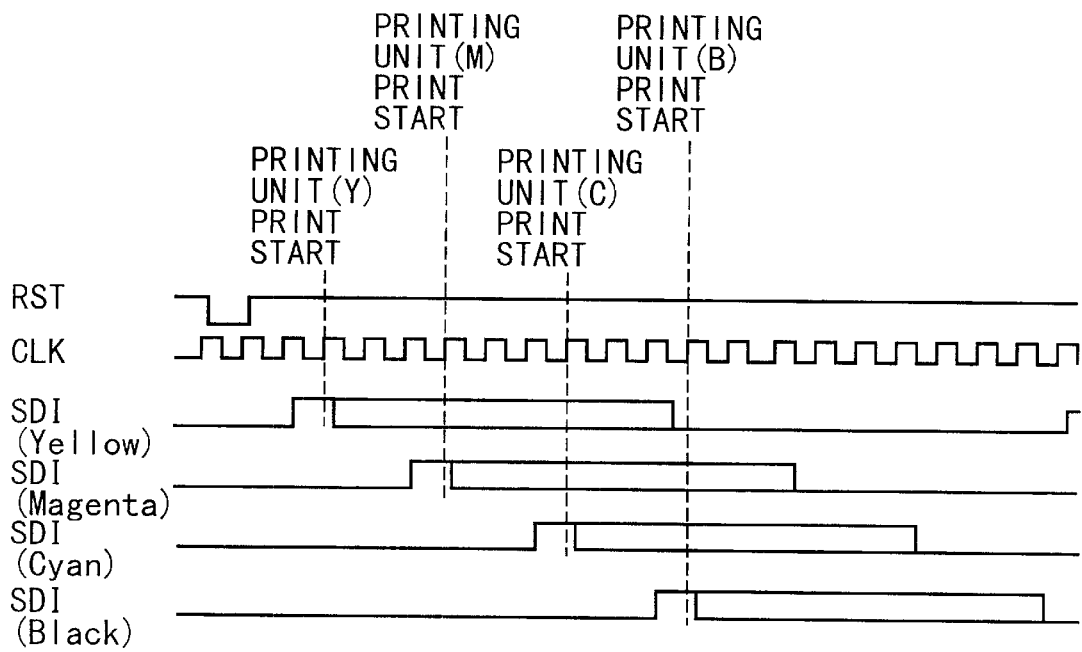
FIG. 21 is a timing chart showing the operational timing of the printer in the eighth embodiment.

In case of carrying out printing operation in the respective printing units, it is enough to output serial data including printing data (SDI) at printing timing of each printing unit, as shown in FIG. 21.

Therefore, four signal lines are required per printing unit and a total of 16 signal lines must be outputted from the head control section. Besides, compared with the conventional case where the printing units should be individually controlled, the number of signals to be outputted from the head control section 101 can be reduced, making it possible to facilitate control.

Ninth Embodiment

Figure 22:
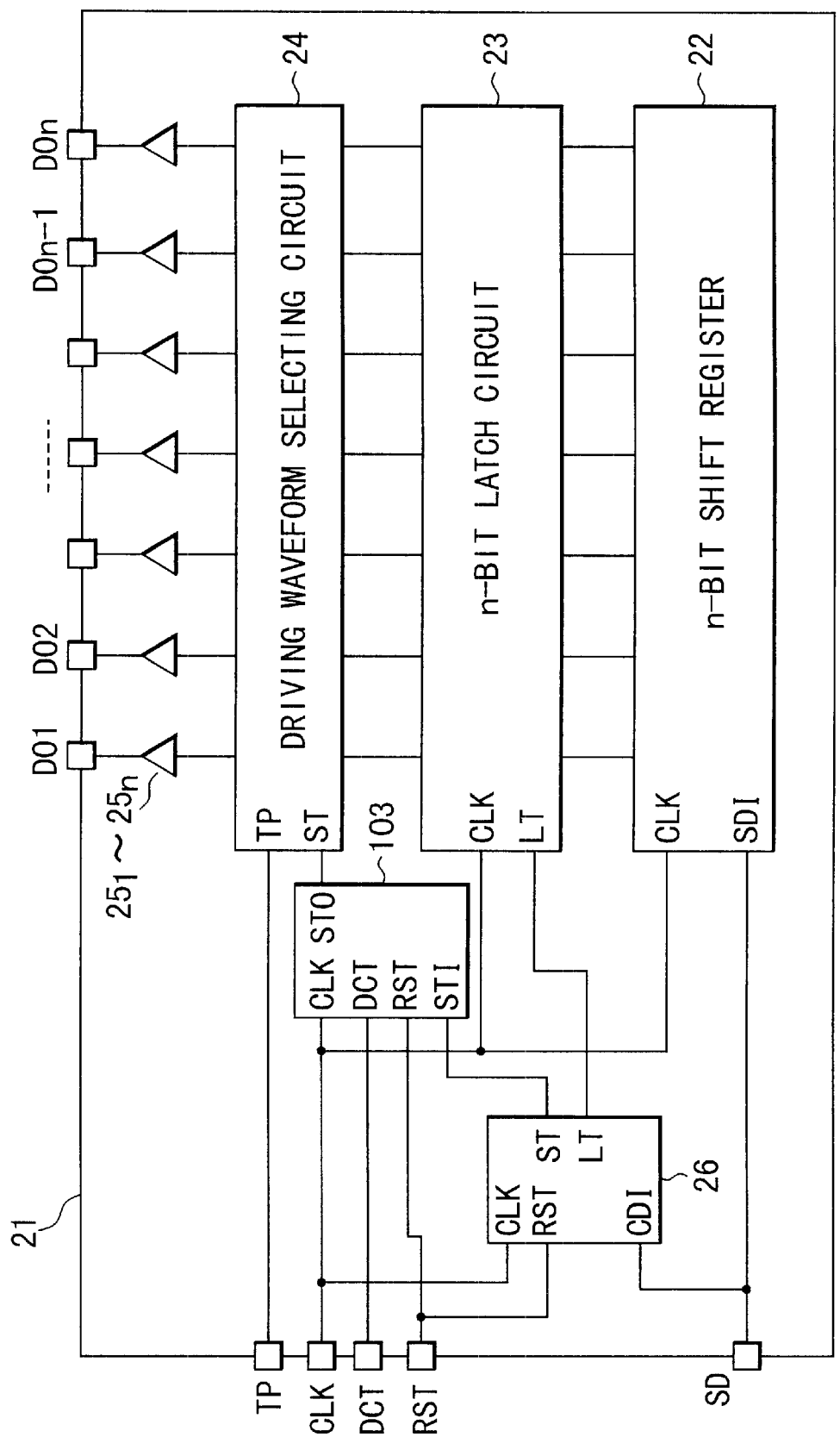
FIG. 22 is a circuit block diagram showing the constitution of a print head driving apparatus in a ninth embodiment according to the present invention.
Figure 24:
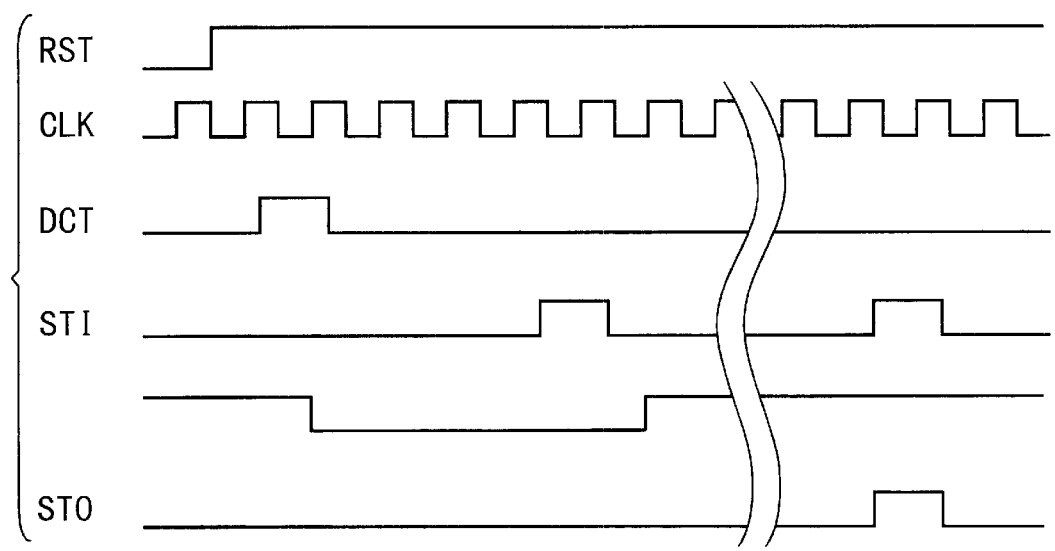
FIG. 24 is a timing chart showing the operational timing of the printer in the ninth embodiment.

Next, description will be given to a print head driving apparatus employing a data control signal DCT and a driving waveform masking circuit 103 as shown in FIG. 22, to thereby allow dispensing with reset terminals (RST) in a shift register and a latch circuit, with reference to the drawings. FIG. 23 is a circuit block diagram showing a driving waveform masking circuit which is a constituent element of a print head driving apparatus shown in FIG. 22. FIG. 24 is a timing chart showing the operational timing of a printer according to this embodiment.

Namely, the shift registers and latch circuits described in the preceding embodiments are provided with reset terminals, respectively and it is necessary to initialize them with a reset signal and then to drive them. If the shift registers and latch circuits are not reset first, it is not seen whether the output level of, for example, a latch circuit after power is turned on is high or low. At that time, if serial data is inputted as in the case of the first embodiment, a driving waveform is outputted from the driving waveform selecting circuit 24 upon the output of the latch circuit to possibly cause so-called trash printing.

The shift registers and latch circuits provided with the reset functions requires gates the number of which corresponds to that of the reset functions, with the result that circuits become large in size.

Considering the above, a data control signal DCT and a driving waveform masking circuit 103 are newly provided as shown in FIG. 22, thereby controlling the apparatus so as not to output a driving waveform in one cycle, in changing of pages and so on (situations in which the reset signal is needed) even with a latch circuit 23 which is not provided with a reset terminal and a shift register 22.

Specifically, as shown in FIG. 23, the driving waveform masking circuit 103 consists of a flip-flop circuit 104 and an AND circuit 105. If a reset signal (RST) is first inputted in accordance with the timing chart shown in FIG. 24, the printing data control circuit 26 and the driving waveform masking circuit 103 are initialized. Then, a data control signal (DCT) for masking a driving waveform is inputted to the driving waveform masking circuit 103. When this signal is inputted to the circuit 103, the /Q output of a JK-FF turns into Low. Thereafter, the /Q output of the JK-FF and an ST signal are added and outputted as an STO signal to the driving waveform selecting circuit 24. In other words, the first ST signal after the DCT signal is inputted is masked and not inputted to the driving waveform selecting circuit 24. Thus, a current carrying signal is not selected. By doing so, it is possible to avoid trash printing even if the shift register circuit 22 and the latch circuit 23 are not reset, ensuring that only the printing data can be printed. Besides, no reset terminal is necessary to the shift register 22 and the latch circuit 23, thereby greatly simplifying circuit arrangement.

As described so far in detail, according to the present invention, serial data consisting of printing data and data of one bit or more added to the printing data is inputted, thereby extracting the printing data with the data of one bit or more other than the printing data as a starting point and outputting driving waveforms for driving a print head. This makes it possible to reduce the number of signal lines necessary to control the head driving apparatus.

Furthermore, if print heads having different print timing are to be controlled, it is possible to control the print heads without increasing the number of signal lines and to reduce the number of IC pins in a head control section controlling the head driving apparatus and the number of communication tables and connector pins for connecting the head driving apparatus to the head control section. Thus, the present invention can provide an inexpensive apparatus. Besides, since small number of signal lines suffice, it is possible to reduce noise or the like generated from signal cables, a substrate and the like.

Moreover, if a plurality of print head driving apparatuses are cascade-connected, a shift register is enabled while the printing data is valid and the register is cleared after the printing data received by the register is latched by a data latch. By doing so, it is possible to prevent the printing data which has been outputted from the print head driving apparatus in an earlier stage from being inputted to a print head driving apparatus in a later stage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A print head driving apparatus comprising:
    input means for inputting serial data which includes printing data and timing data, the serial data being an electrical potential signal;
    extracting means for detecting the timing data included in the serial data inputted by the input means and for extracting the printing data from the serial data with the detected timing data as a starting point; and
    output means for outputting a driving signal for driving a print head for printing based on the printing data extracted by the extracting means.

2. A print head driving apparatus according to claim 1, wherein the data extracting means includes:
    a printing data number counter for counting the number of printing data, with the timing data included in the serial data, the serial data having at least 1-bit of timing data added in front of the printing data, inputted by the input means, used as a starting point; and
    a shift register for receiving the printing data based on counting of the printing data counter.

3. A print head driving apparatus according to claim 2, wherein the printing data number counter includes:
    setting means for setting a count number in accordance with a quantity of data which can be received by the shift register once, with the timing data included in the serial data inputted by the input means used as a starting point.

4. A print head driving apparatus according to claim 1, wherein the printing data extracting means includes:
    a printing data number counter for counting the number of printing data, with the timing data included in the serial data inputted by the input means used as a starting point;
    a shift register for receiving the printing data based on counting of the printing data number counter; and
    a latch circuit, connected to the shift register, for latching the printing data received by the shift register, the latch circuit starting latching when the printing data number counter finishes counting.

5. A print head driving apparatus according to claim 1, wherein the extracting means includes:
    enable signal output means for outputting an enable signal only while the printing data is valid; and
    holding means for holding the printing data inputted by the input means based on the enable signal having the predetermined value.

6. A print head driving apparatus according to claim 2, further comprising:
    a latch circuit for latching printing data received by the shift register, with the timing data inputted by the input means used as a starting point.

7. A print head driving apparatus according to claim 1, wherein the output means includes:
    second output means for outputting the driving signal, with the timing data included in the serial data inputted by the input means used as a starting point.

8. A print head driving apparatus according to claim 2, wherein the output means includes:
    second output means for outputting a driving signal, outputting of said means starting when the printing data number counter in the data extracting means finishes counting.

9. A print head driving apparatus according to claim 4, wherein:
    the print head driving apparatus includes a plurality of print head driving apparatuses cascade-connected to one another;
    each of the print head driving apparatuses includes:
        means for inputting the serial data including the printing data using the input means, the serial data having an order such that printing data processed by a print head driving apparatus connected in a later stage is put in front of the printing data processed by a print head driving apparatus connected in an earlier stage;
        clear means for clearing the shift register after the latching means latches the printing data received by the shift register; and
        counting means for setting a value, obtained by adding the number of original apparatuses to the number of print head driving apparatuses connected in later stages and multiplying the addition result by the number of printing data received by the original apparatuses, as a count number of the printing data number counter in the printing data extracting means for each print head driving apparatus individually, and for allowing the printing data number counters of the printing data extracting means to sequentially start counting every time the input means of the head driving apparatuses input the timing data.

10. A print head driving apparatus according to claim 4, wherein:
    the print head driving apparatus includes a plurality of print head driving apparatuses cascade-connected to one another;
    each of the print head driving apparatuses inputs the serial data, including the printing data and having an order such that printing data processed by a print head driving apparatus connected in a later stage is put ahead of printing data processed by a print head driving apparatus connected in an earlier stage, using the input means; and
    the input means is provided with two input terminals for inputting the serial data, the serial data from one input means being inputted to the printing data number counter and the serial data from another input terminal being inputted to the shift register.

11. A print head driving apparatus according to claim 4, wherein:
    the print head driving apparatus includes a plurality of print head driving apparatuses cascade connected to one another;
    each of the print head driving apparatuses includes:
        second input means for inputting the serial data, including the printing data and having an order such that printing data processed by a print head driving apparatus connected in a later stage is put ahead of printing data processed by a print head driving apparatus connected in an earlier stage, using the input means; and
        output data selecting means for selecting one of the serial data inputted by the second input means and the serial data inputted to, shifted by and outputted from the shift register, and for outputting the selected serial data to the print head driving apparatus in a next stage.

12. A print head driving apparatus according to claim 2, wherein the extracting means includes:
    clear means for clearing the shift register; and data holding means for holding the printing data received by the shift register, data holding of the data holding means starts when the timing data included in the serial data inputted by the input means is shifted by and outputted from the shift register.

13. A print head driving apparatus according to claim 1, wherein the extracting means includes:

enable signal output means for outputting an enable signal only while the printing data is valid; and holding means for holding the printing data by the shift register if the enable signal outputted from the enable signal output means is the predetermined value.

14. A print head driving apparatus according to claim 1, wherein the extracting means includes:

inverter means for detecting and outputting only the timing data from the serial data inputted by the input means; and second extracting means for extracting the printing data from the serial data by the shift register reset in accordance with an output of the inverter means.

15. A print head driving apparatus according to claim 1, wherein the extracting means includes:

enable signal output means for creating and outputting an enable signal corresponding to one cycle of the timing data based on the serial data inputted by the input means; and holding means for holding the printing data by the shift register for every cycle based on the enable signal from the enable signal output means.

16. A color print head driving apparatus comprising:

print head driving devices of a predetermined number which supply driving signals for printing to color print heads of the predetermined number, respectively, each of the print head driving devices of the predetermined number including:

input means for inputting serial data including one item of printing data among a plurality of items of printing data for color printing and timing data put in the printing data, the serial data being an electrical potential signal;

extracting means for detecting the timing data included in the serial data inputted by the input means and for extracting the printing data from the serial data with the timing data used as a starting point; and output means for outputting a driving signal for driving the color print heads for printing based on the printing data extracted by the extracting means.

17. A print head driving apparatus according to claim 1, wherein:

the extracting means includes a shift register without a reset signal terminal and second extracting means for extracting the printing data from the serial data using a latch circuit without a reset signal terminal; and the output means includes second output means, controlled by a control signal applied, not for outputting unnecessary driving signals and outputting driving signals after the first driving signal based on the printing data extracted by the extracting means.

18. A printer apparatus comprising:

input means for inputting serial data including printing data and timing data put in the printing data, the serial data being an electrical potential signal;

extracting means for detecting the timing data included in the serial data inputted by the input means and for extracting the printing data from the serial data with the timing data used as a starting point;

output means for outputting a driving signal for driving a print head for printing based on the printing data extracted by the extracting means; and forming means for receiving the driving signal from the output means and for forming a predetermined image on an image forming medium in response to the driving signal.

* * * * *